United States Patent [19]

Uzawa et al.

[11] Patent Number: 4,796,301

[45] Date of Patent: Jan. 3, 1989

[54] IMAGE TRANSMISSION APPARATUS

[75] Inventors: Shunichi Uzawa, Tokyo; Tetsuzo Mori, Kawasaki; Noboru Koumura, Narashino, all of Japan

[73] Assignee: Canon Kabushiki Kaisha, Tokyo, Japan

[21] Appl. No.: 799,280

[22] Filed: Nov. 19, 1985

Related U.S. Application Data

[63] Continuation of Ser. No. 432,757, Oct. 4, 1982, abandoned.

[30] Foreign Application Priority Data

| Oct. 9, 1981 | [JP] | Japan | 56-160158 |
| Oct. 9, 1981 | [JP] | Japan | 56-160161 |
| Oct. 19, 1981 | [JP] | Japan | 56-165616 |

[51] Int. Cl.$^4$ .................................................. H04B 9/00
[52] U.S. Cl. ..................................... 455/607; 455/603; 370/1
[58] Field of Search ............... 455/606, 607, 617, 619, 455/612, 605, 603; 370/4, 1; 358/258

[56] References Cited

U.S. PATENT DOCUMENTS

| 4,028,733 | 6/1977 | Ulicki | 358/102 |
| 4,096,380 | 6/1978 | Eichweber | 455/603 |
| 4,153,916 | 5/1979 | Miwa et al. | 358/257 |
| 4,193,119 | 3/1980 | Arase et al. | 364/900 |
| 4,330,870 | 5/1982 | Arends | 455/607 |
| 4,456,793 | 6/1984 | Baker et al. | 455/607 |
| 4,467,468 | 8/1984 | Miller | 370/4 |

FOREIGN PATENT DOCUMENTS

| 2823931 | 5/1978 | Fed. Rep. of Germany | 455/617 |
| 56-32842 | 4/1981 | Japan | 455/619 |

OTHER PUBLICATIONS

Gfeller et al–"Wireless in House DATA Communication"–Proc. of the IEEE No. 11, Nov. 1979, pp. 1474–1486.

Horak–TV Program Distribution–Confi. International Broadcasting Convention–London, England–20-24 Sep. 1976, pp. 228–231.

Primary Examiner—Robert L. Griffin
Assistant Examiner—Andrew J. Telesz, Jr.
Attorney, Agent, or Firm—Fitzpatrick, Cella, Harper & Scinto

[57] ABSTRACT

An image transmission apparatus for light-signal image transmission is easy to install and relocate and ensures reliable transmission between a plurality of readers in remote locations and a central recorder. Each reader provides data signals and command signals for controlling the operation of the recorder from the quantized image data of an original. The amplified and frequency-modulated signals proceded by image or command header signals are transmitted to the recorder. A signal intensity from the reader may be discriminated to be above a minimum acceptable level before being recorded, with an indicator of a recorder provided to warn an operator of an unacceptable low level, thereby preventing low-quality recording; a recording state may be indicated to the operator by a lamp or a buzzer. The recorder may further have a transmission request register and a priority encoder for resolving a contention arising when two or more readers simultaneously request service, by generating and assigning priority codes to each reader. The priority codes may be either predetermined, for example, so as to give one reader emergency priority over all other readers, or may be arbitrarily set according to demand.

16 Claims, 24 Drawing Sheets

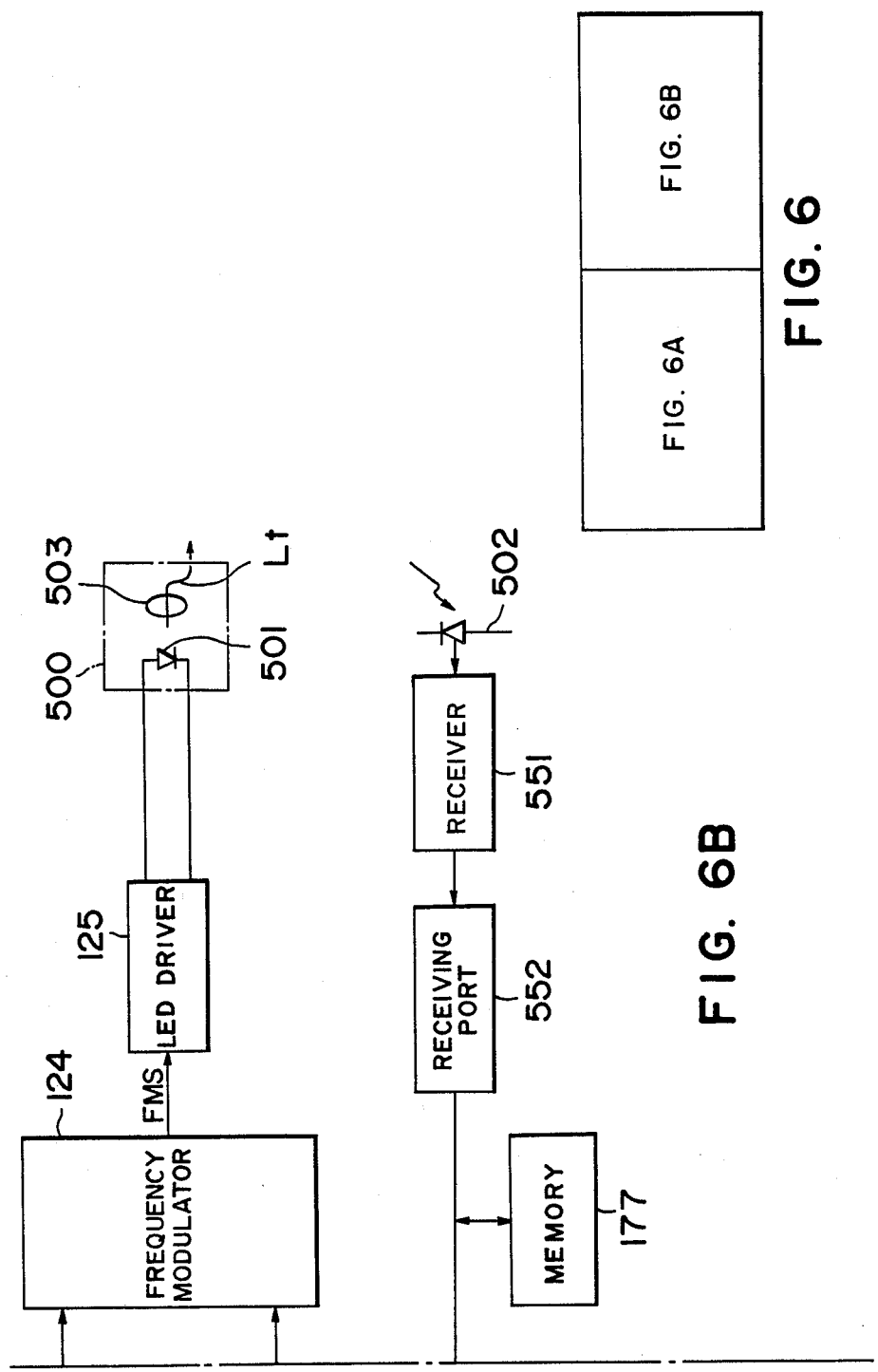

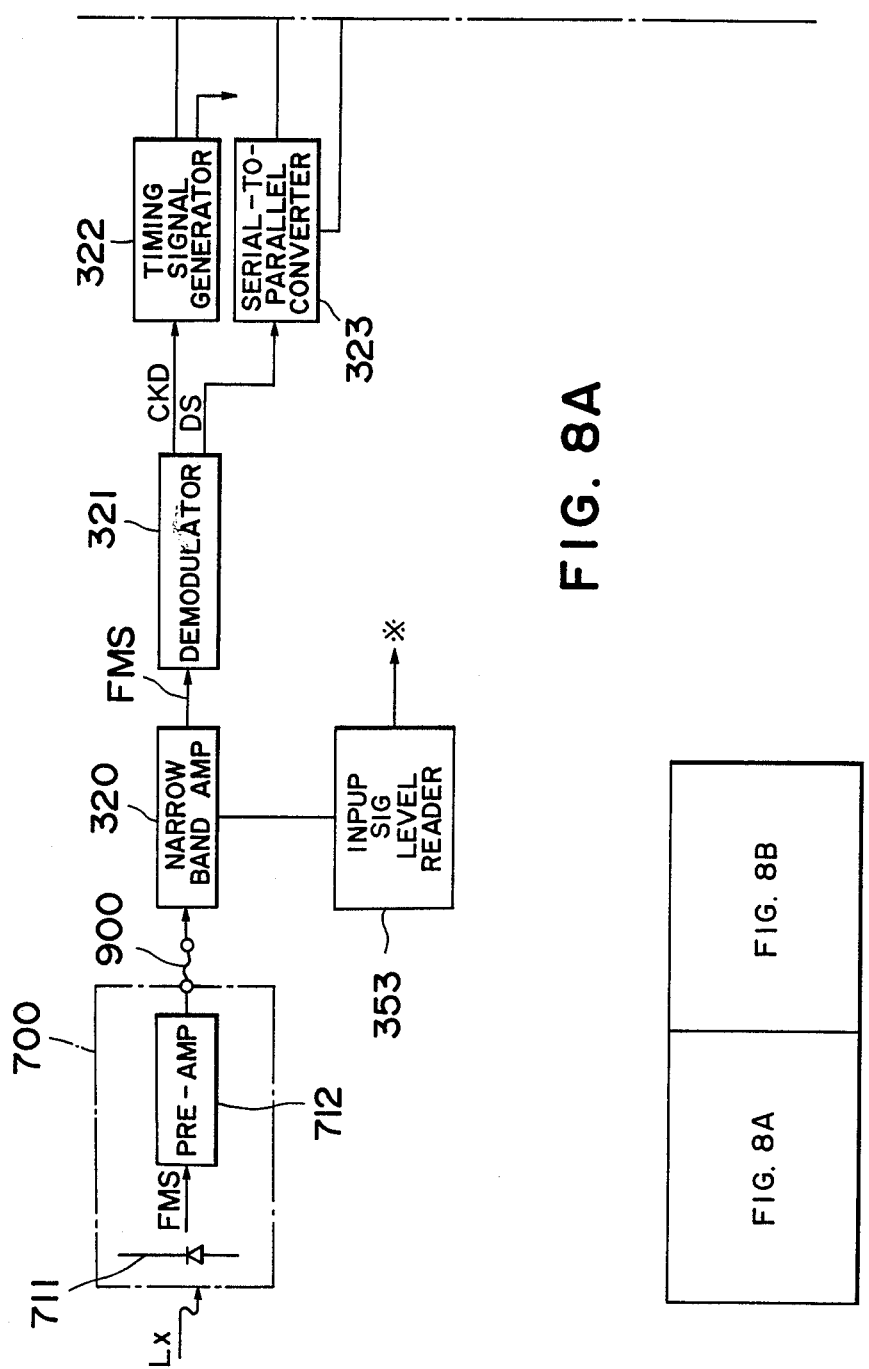

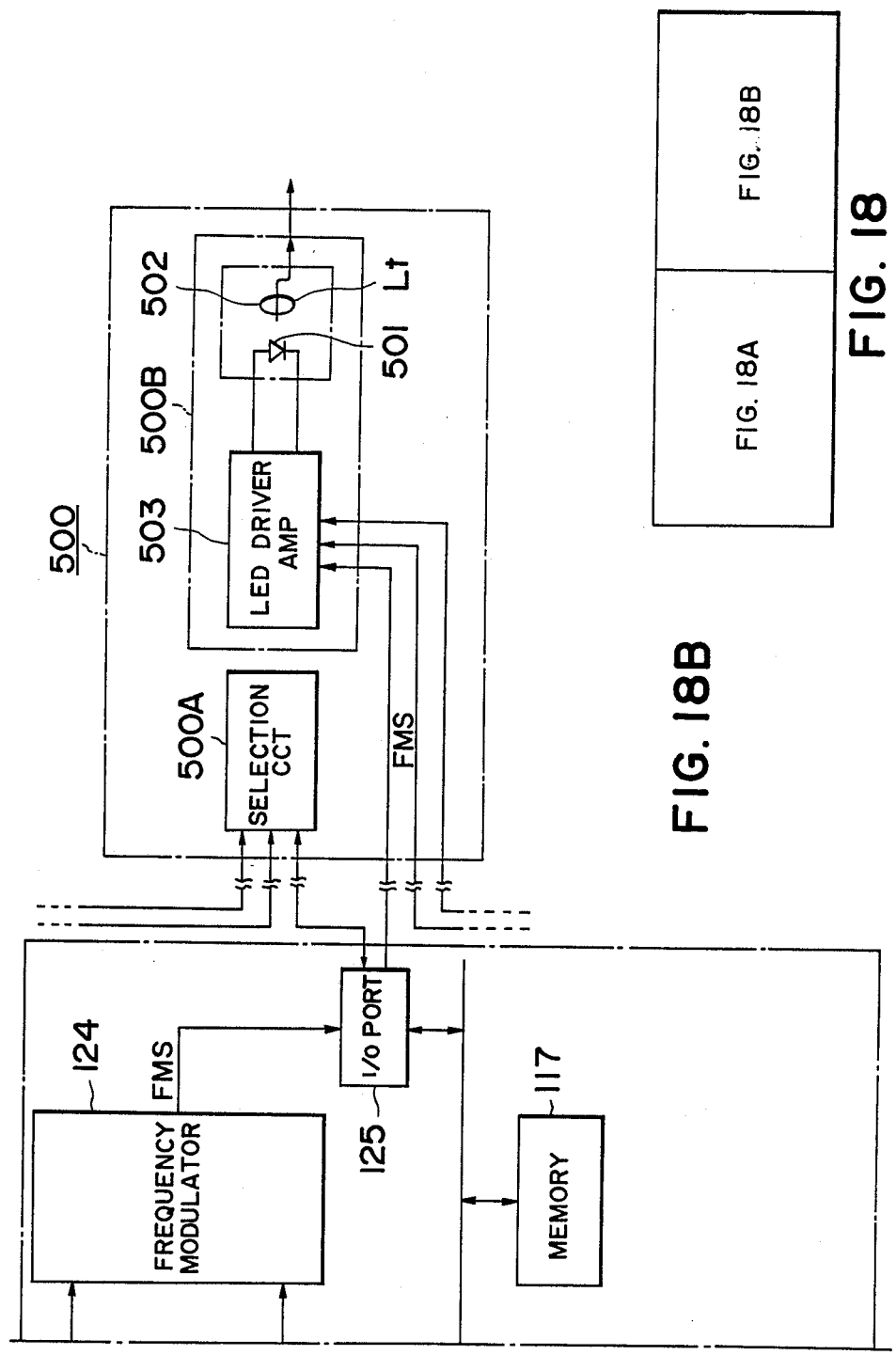

IMAGE TRANSMISSION APPARATUS

This application is a continuation of application Ser. No. 432,757 filed Oct. 4, 1982, now abandoned.

BACKGROUND OF THE INVENTION

1. Field of the Invention

The present invention relates to an image transmission apparatus and, more particularly, to an image transmission apparatus suitable for image transmission with light signals.

2. Description of the Prior Art

An image transmission apparatus such as a facsimile is known for transmission of image data between remote locations.

However, a conventional image apparatus of this type is not preferable from the viewpoint of ease of installation and moving.

A local area network is also proposed which transmits data within a limited area such as within a factory or a building. However, when the local area network is realized with a conventional image transmission method, it is hard to satisfy the requirements of reliable transmission of data, high-speed transmission or noiseless transmission.

In the transmission of data from terminal devices located at a plurality of positions to one central processing unit, handling of data is difficult.

Depending upon the distance between the transmitter and the receiver, the environments thereof or the like, data may be affected and may not be reliably transmitted.

SUMMARY OF THE INVENTION

The present invention has been made in consideration of this and has for its object to allow reliable transmission of image data.

It is another object of the present invention to facilitate transmission of data from a plurality of transmitting devices to a single receiving device.

It is still another object of the present invention to allow one of several remote devices to recognize the operation of the remaining devices.

It is still another object of the present invention to allow easy recognition of the state of a transmitted signal.

It is still another object of the present invention to provide an image transmission apparatus suitably adapted for image data transmission within a relatively narrow geographical area.

It is still another object of the present invention to provide an image transmission apparatus suitably adapted for image data transmission with light signals.

The above and other objects of the present invention will become apparent from the following description.

BRIEF DESCRIPTION OF THE DRAWINGS

FIGS. 6, 6A, and 6B are a block diagram showing examples of a control circuit of the reader and a phototransmitter;

FIGS. 8, 8A, and 8B are a block diagram showing examples of the control circuit of the reader and a photoreceiver;

FIGS. 13, 13A-1, 13A-2, 13B-1, and 13B-2 are flowcharts showing the flows of operation according to the present invention;

FIGS. 18, 18A, and 18B are a block diagram of the reader shown in FIG. 16;

DETAILED DESCRIPTION OF THE PREFERRED EMBODIMENTS

The present invention will now be described in detail with reference to the accompanying drawings.

Figure 1:
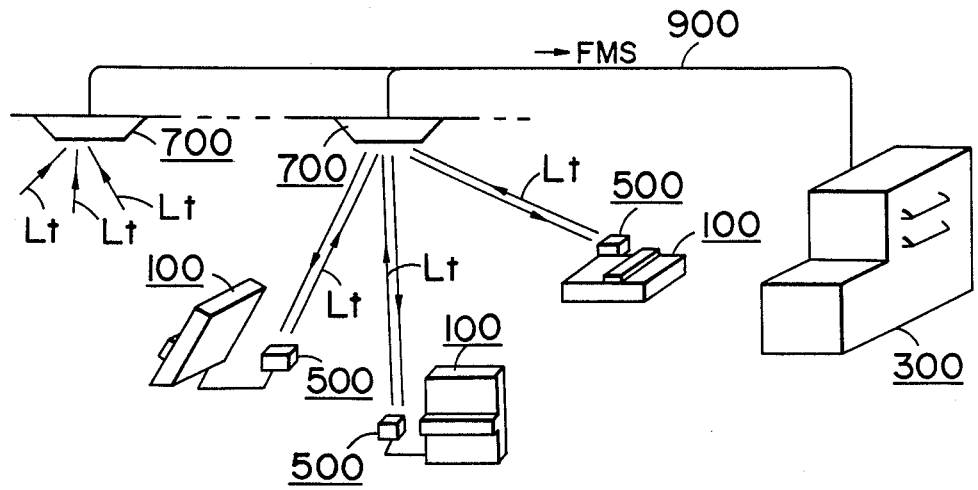
FIG. 1 is a view showing the arrangement of an image transmission apparatus according to an embodiment of the present invention.

FIG. 1 shows an image transmission apparatus according to an embodiment of the present invention. Readers 100 arranged separately from each other photoelectrically read an image of an original with a one-dimensional solid-state image pickup element such as a CCD line image sensor and generate time-serial image data VDA. The image data VDA is quantized to obtain quantized image data VD. The quantized image data VD together with command data CD for controlling the operation of a recorder 300 is supplied to a frequency modulator within each reader 100. Predetermined clock signals are pulse-frequency-modulated by the frequency modulator in accordance with these signals (to be collectively referred to as data signals DS hereinafter). Output signals, that is, pulse-frequency-modulated signals FMS from the frequency modulator, are supplied to a phototransmitter 500 and are converted thereby into light beams Lt. These light beams Lt become incident on a photoreceiver 700 mounted on the ceiling or the like. Various signals from the recorder 300 are supplied through a light-emitting element of the photoreceiver 700 to a light-receiving element of each phototransmitter 500.

Figure 2:
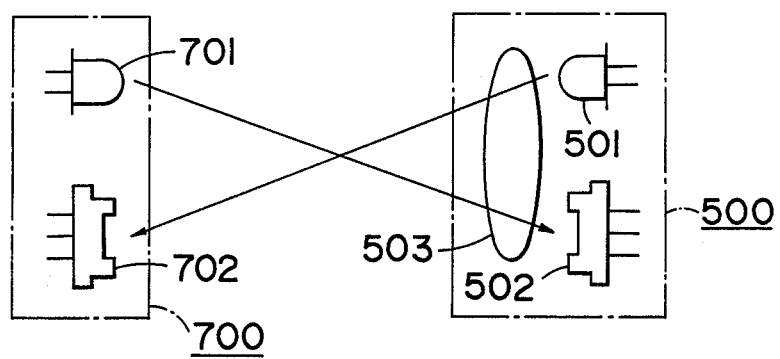
FIG. 2 is a model view for explaining an example of data transmission by space optical transmission.

FIG. 2 shows an example of the configuration of the phototransmitter 500 and the photoreceiver 700. The phototransmitter 500 has a pair consisting of a light-emitting element 501 and a light-receiving element 502. The light-emitting element 501 may be a light-emitting diode or a laser diode, and the light-receiving element 502 may be an avalanche diode or the like. A lens 503 serves to collect light emitted by the light-emitting element 501 and to focus.light incident on the phototransmitter 500 onto the light-receiving element 502. The photoreceiver 700 also has a similar pair consisting of a light-emitting element 701 and a light-receiving element 702. Under control of the recorder 300, the light-emitting element 701 is driven. The light-receiving elements 502 and 702 convert the intensity of the light beams Lt into electric signals to reproduce the pulse-frequency-modulated signals FMS described above. The photoreceiver 700 supplies the pulse-frequency-modulated signals FMS to the recorder 300 through a coaxial cable 900. The recorder 300 extracts the image data VD, a write control clock signal CKW, and the command data CD from the received pulse-frequency-modulated signals FMS. On the basis of these signals, the recorder 300 performs a predetermined image recording operation.

Figure 3A:
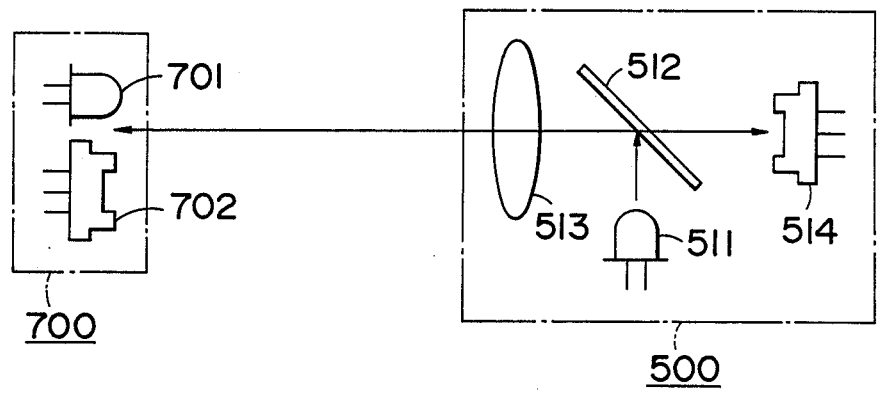
FIGS. 3A and 3B are model views for explaining other examples of data transmission by space optical transmission.
Figure 3B:
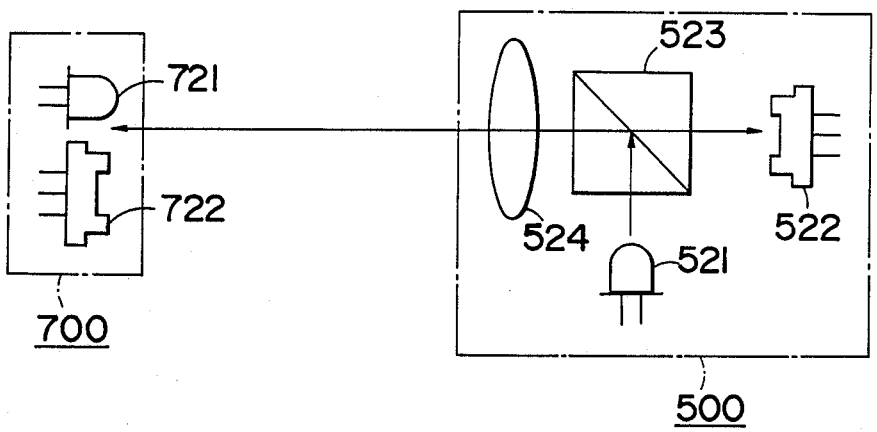

FIGS. 3A and 3B show other examples of the phototransmitter 500 and the photoreceiver 700 for realizing bidirectional communication therebetween. Referring to FIG. 3A, light emitted by a light-emitting element 511 of the same configuration as described above is reflected by a half mirror 512 and is returned to the light-receiving element 702 of the photoreceiver 700 and passed through a lens 513. A light-receiving element 514 of the configuration as described above converts into electric signals the light emitted by the light-emitting element 701 through the lens 513 and the half mirror 512.

Referring to FIG. 3B, a light-emitting element 521 emits infrared light, a light-receiving element 522 receives visible light, a light-emitting element 721 emits the visible light, and a light-receiving element 722 receives the infrared light. The visible light from the light-emitting element 721 is received by a lens 524 and a dichroic mirror 523 which reflects infrared light and which transmits visible light. The infrared light emitted by the light-emitting element 521 under the control of the recorder 300 is reflected by the dichroic mirror 523 and is received by the light-receiving element 722 through the lens 524. Combinations of other types of light may also be adopted, depending upon the properties of the dichroic mirror 523, in addition to the combination of infrared light and visible light.

Figure 4:
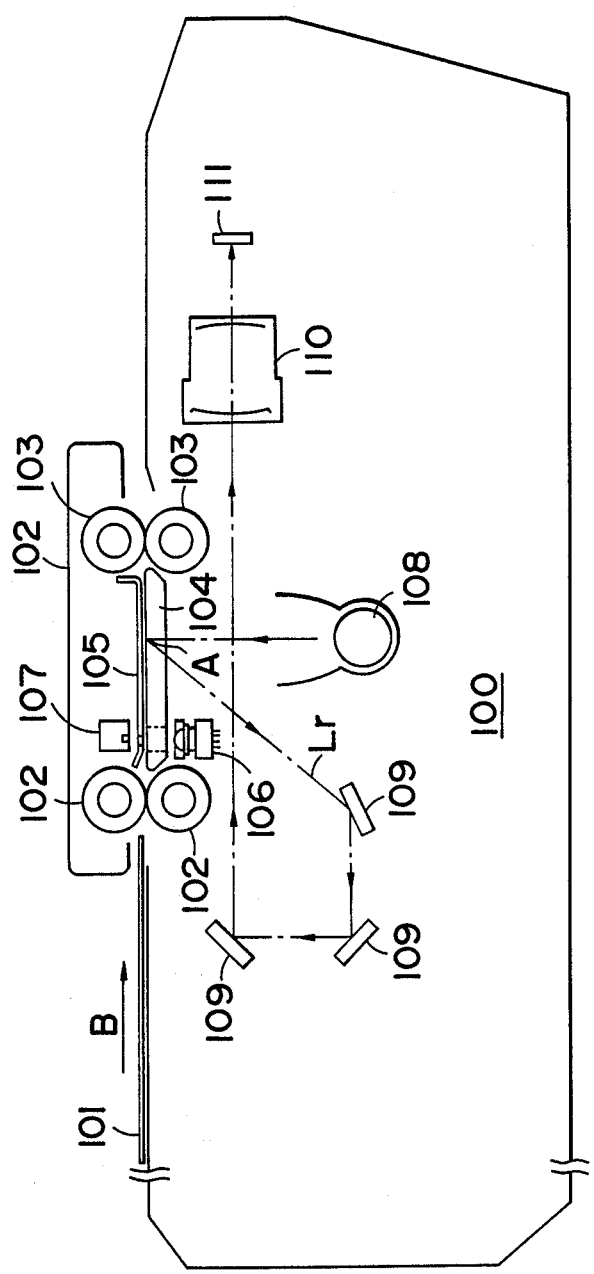
FIG. 4 is a view showing an example of a reader.

FIG. 4 shows an example of a reading mechanism of the reader 100. An original 101 in the form of a sheet is fed by paper feed rollers 102 and 103 in the direction indicated by arrow B. A platen 104 is arranged in the original convey path. The image on the rear surface of the original 101 passing reading position A of the platen 104 is sequentially read in units of lines. An original feed guide 105 securely holds the original 101 so as to allow clear reading of the image thereon. An original detector consisting of a light-emitting element 106 and a light-receiving element 107 detects the edge of the original 101 when light emitted from the light-emitting element 106 is shielded from the light-receiving element 107. A detection signal from the original detector is used as a timing signal for controlling the recorder 300.

An original-illuminating rod-shaped light source 108 such as a halogen lamp illuminates from below the reading position A of the platen 104. Reflecting mirrors 109 reflect image light Lr reflected from the original, in the manner as shown in the figure. A focusing lens 110 focuses the image light Lr onto the light-receiving plane of a CCD line image sensor 111. The CCD line image sensor 111 converts the incident image light Lr into time-serial image data VDA of a predetermined number of bits.

Figure 5:
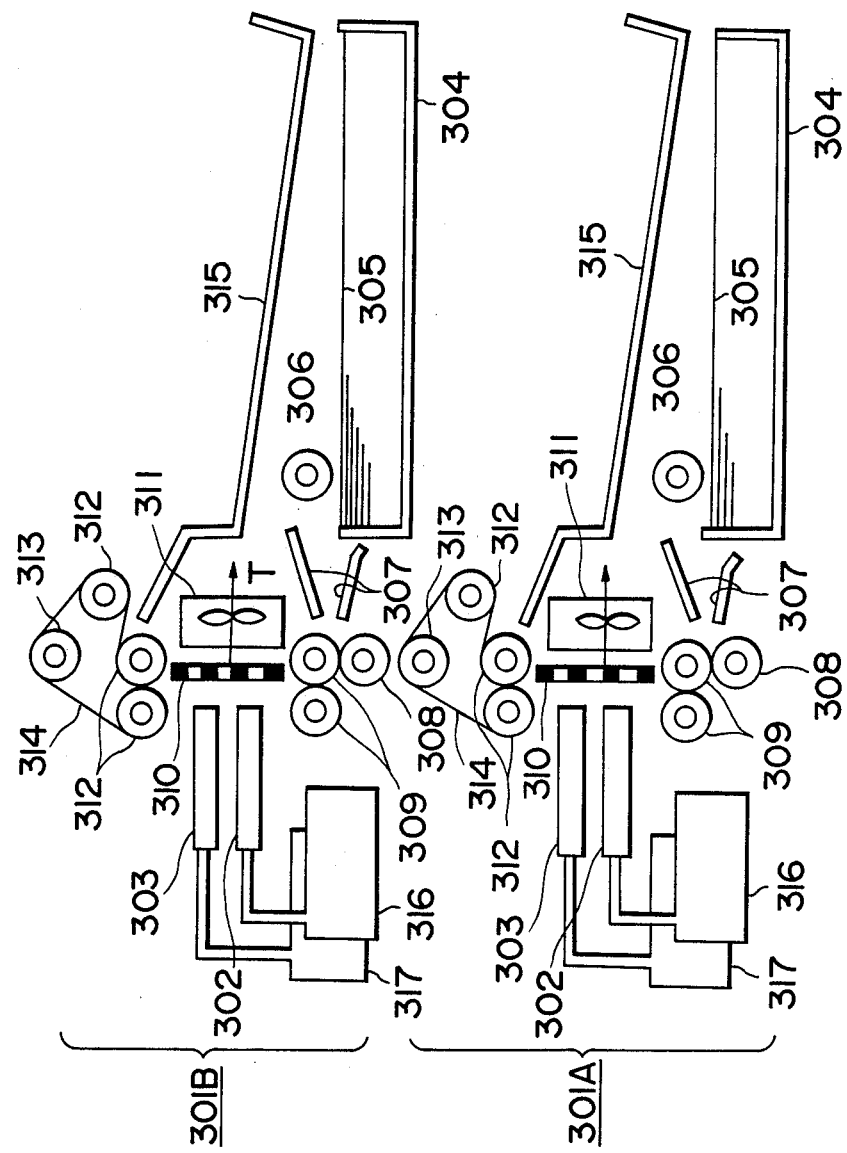
FIG. 5 is a view showing another example of the reader.

FIG. 5 shows a recording mechanism of the recorder 300 incorporating a first recording mechanism 301A and a second recording mechanism 301B. Since the structures of the two recording mechanisms 301A and 301B are the same, only the respective recording mechanisms are designated by reference numerals having the symbols A and B to differentiate between the two, and the individual parts thereof will be denoted by the same reference numerals.

Each of the first and second recording mechanisms 301A and 301B has two recording heads, such as ink jet heads, 302 and 303. Each of these ink jet heads 302 and 303 is a full-line ink jet head wherein a plurality of recording elements are linearly aligned in the vertical direction in FIG. 5, and each is driven for recording by the image data VDA from the CCD line image sensor 111. In this embodiment, the ink jet head 302 performs black normal mode recording of 16 dots/mm density, and the ink jet head 303 performs red normal mode recording of 8 dots/mm density. The first and second recording mechanisms 301A and 301B are vertically stacked by a support (not shown).

Each of the first and second recording mechanisms 301A and 301B further has a recording paper storage cassette 304 holding recording paper sheets 305, a pickup roller 306, guide plates 307, a register roller 308, first convey rollers 309, a platen 310 with a number of pores, a fan 311, second convey rollers 312, a suspension roller 313, a conveyor belt 314, a paper exhaust tray 315, and ink tanks 316 and 317.

The recording operation of the first and second recording mechanisms 301A and 301B will now be described. Since these recording mechanisms 301A and 301B operate in the same manner except that they are selectively driven by the signals supplied from the readers 100, a description will be made only of the first recording mechanism 301A.

The recording paper sheet 305 stored in the cassette 304 is fed along the guide plates 307 by the rotation of the pickup roller 306 to the register roller 308 which is now held stationary, thereby forming a loop of desired size. Subsequently, as the register roller 308 rotates, the recording paper sheet 305 is held by the register roller 308 and the first convey rollers 309 to be fed toward the ink jet heads 302 and 303. The platen 310 with small pores and the fan 311 are opposed to the ink jet heads 302 and 303. Upon rotation of the fan 311, air is blown in the direction indicated by arrow T in the figure. Therefore, the recording paper sheet 305 fed through the first convey rollers 309 is drawn by the fan 311 to be fed over the platen 310 toward the second convey rollers 312. During the course of this feeding operation, the ink jet head 302 or 303 is driven to record in accordance with the image data VD which is read by the CCD line image sensor 111 and is transmitted by optical communication. When the leading edge of the recording paper sheet 305 is fed to the second convey rollers 312 after recording, it is exhausted to the paper exhaust tray 315 by the second convey rollers 312 and the conveyor belt 314.

Figure 6A:
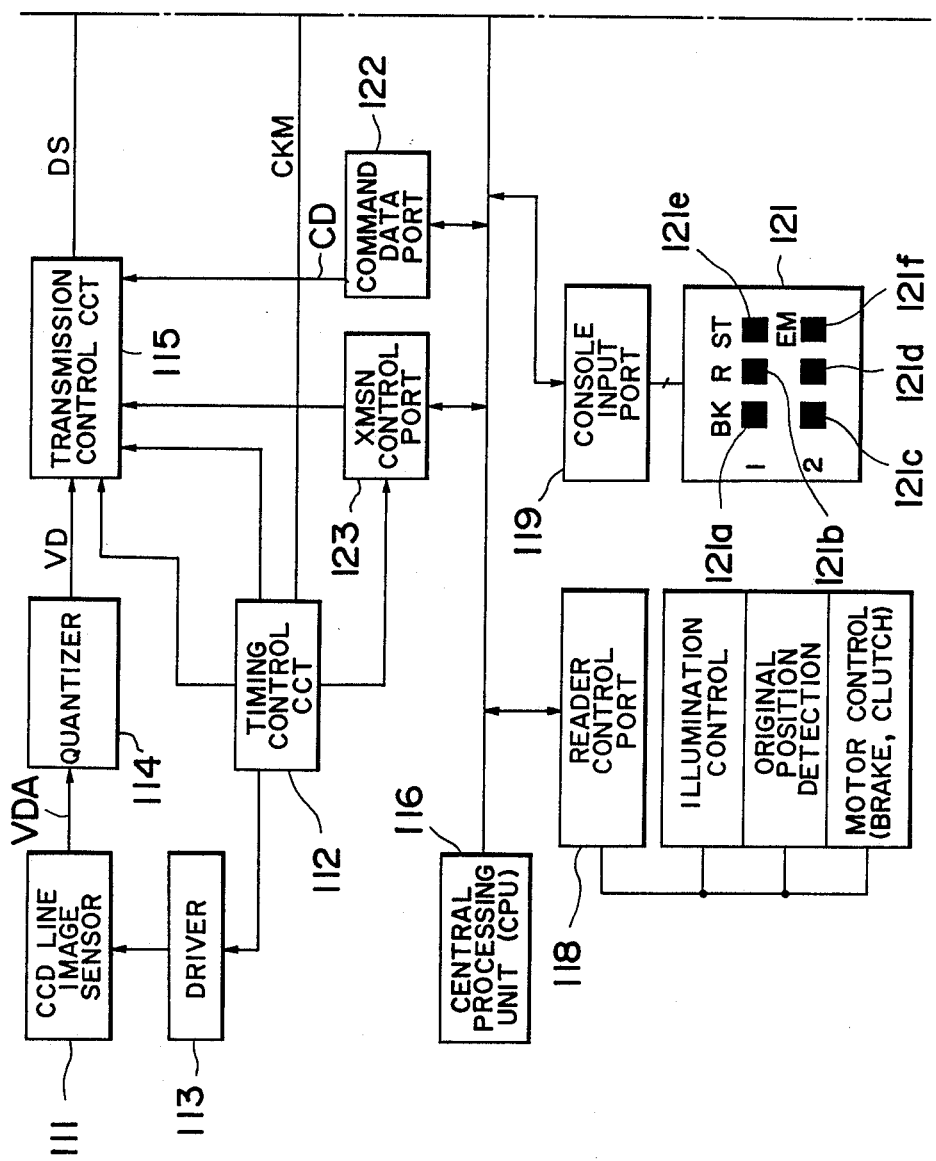

FIG. 6 is a block diagram of a control circuit for the reader 100 and the phototransmitter 500. The CCD line image sensor 111 is driven by a driver 113 controlled by a timing signal from a timing control circuit 112 to generate the time-serial image data VDA. A quantizer 114 quantizes the image data VDA. The quantized image data VD from the quantizer 114 is supplied to a transmission control circuit 115. A central processing unit 116 (to be referred to as a CPU for brevity hereinafter) controls the operation of each part of the reader 100 in accordance with a control program written in a memory 117 which comprises a RAM, ROM or the like. A reader control port 118 produces a flash signal to the light source 108, and a drive signal to the clutch or brake so as to rotate or interrupt rotation of the paper feed rollers 102 and 103. The reader control port 118 also receives the detection signal from the original detector consisting of the light-emitting element 106 and the light-receiving element 107. A console input port 119 receives a recording mechanism control signal from a control console 121 arranged on a cover 120 at the top surface of the reader 100. The control console 121 has four push buttons 121a to 121d for selecting the recording mechanism and recording color, a recording start button 121e, and a cancel button 121f. When the push button 121a, for example, is depressed, the received image data VD is supplied to the ink jet head 302 of the first recording mechanism 301A to perform recording in black. The relationships between the respective push buttons, recording mechanisms and recording colors are shown in a table below. One of the buttons 121a and 121b associated with the first recording mechanism, 301A and one of the buttons 121c and 121d associated with the second recording mechanism 301B may also be depressed simultaneously. In this case, simultaneous recording with the first and second recording mechanisms may be performed.

TABLE

| Push Button No. | Recording Mechanism No. | Recording Color |
| --- | --- | --- |
| 121a | 301A | Black |
| 121b | 301A | Red |
| 121c | 301B | Black |
| 121d | 301B | Red |

A command data port 122 supplies to the transmission control circuit 115 various command data CD for controlling the recording operation of the first and second recording mechanisms 301A and 301B. A XMSN (transmission) control port 123 supplies a transmission control signal to the transmission control circuit 115 so as to control the operation thereof. In accordance with the transmission control signal and the timing signal, the transmission control circuit 115 subjects to a predetermined processing the image data VD supplied from the quantizer 114 or the command data CD supplied from the command data port 122. An output signal (data signal) DS from the transmission control circuit 115 is supplied to a frequency modulator 124.

In this embodiment, in order to facilitate differentiation between the image data VD and the command data CD, an image header VH or a command data header CH of different bit number and also serving as a synchronizing signal is added to the start position of the image data VD or the command data CD, respectively. The data signal DS with such headers is supplied to the frequency modulator 124. The frequency modulator 124 pulse-frequency-modulates clock signals CKM supplied from the timing control circuit 112 in accordance with the data signal DS supplied in the manner that will be described later.

A pulse-frequency-modulated signal FMS from the frequency modulator 124 is supplied to an LED driver amplifier 125 whose output drives the light-emitting element 501 of the phototransmitter 500. The light emitted by the light-emitting element 501 is focused by the lens 503 into the light beam Lt which becomes incident on the photoreceiver 700.

The light-receiving element 502 of the phototransmitter 500 receives light emitted by the light-emitting element 701 of the photoreceiver 700. The light received by the light-receiving element 502 is supplied to the various parts of the circuitry through a receiver 551 and a receiving port 552.

Figure 8B:
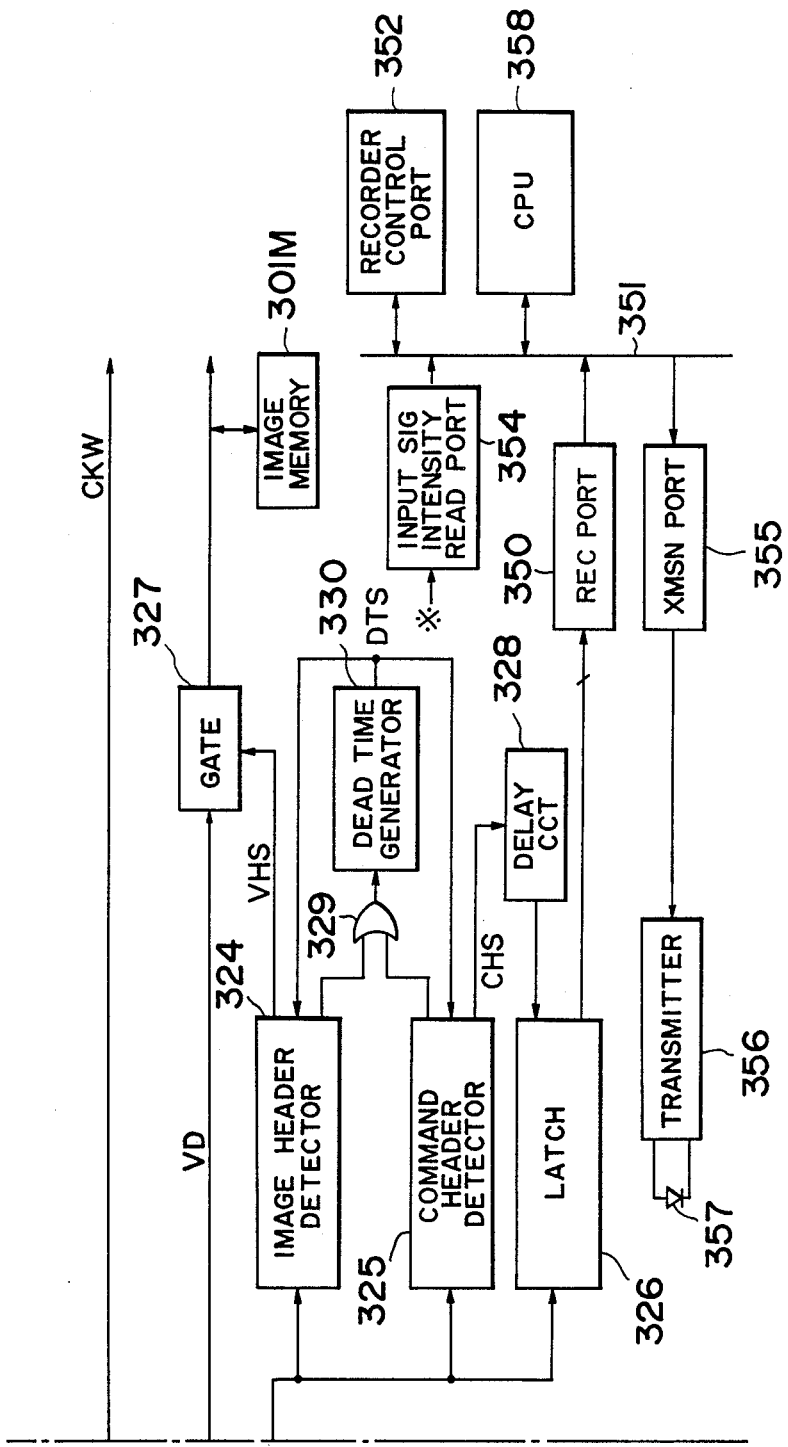

FIG. 8 shows the control circuit for the recorder 300 and the photoreceiver 700. The light beam Lt from the phototransmitter 500 is converted into an electric signal or the pulse-frequency-modulated signal FMS by an avalanche photodiode 711. A preamplifier 712 amplifies the pulse-frequency-modulated signal FMS and produces an output signal which is supplied to a narrow band amplifier 320 of the recorder 300 through the coaxial cable 900 described above. An output signal from the narrow band amplifier 320 is supplied to a demodulator 321.

The demodulator 321 separates a demodulated clock signal CKD and a demodulated data signal DS from the pulse-frequency-modulated signal FMS. The demodulated clock signal CKD is supplied to a timing signal generator 322 which generates the write control signal CKW. The write control signal CKW is used for timing control of recording operations of the first and second recording mechanisms 301A and 301B. The demodulated data signal DS is supplied to a serial-to-parallel converter 323. The serial-to-parallel converter 323 converts the demodulated data signal DS (time-serial pulses) into a parallel pulse signal PS. The pulse signal PS is supplied to an image header detector 324, a command header detector 325 and a latch 326. The serial demodulated data signal DS is delayed for a predetermined time duration and is supplied to a gate 327.

Figure 7:
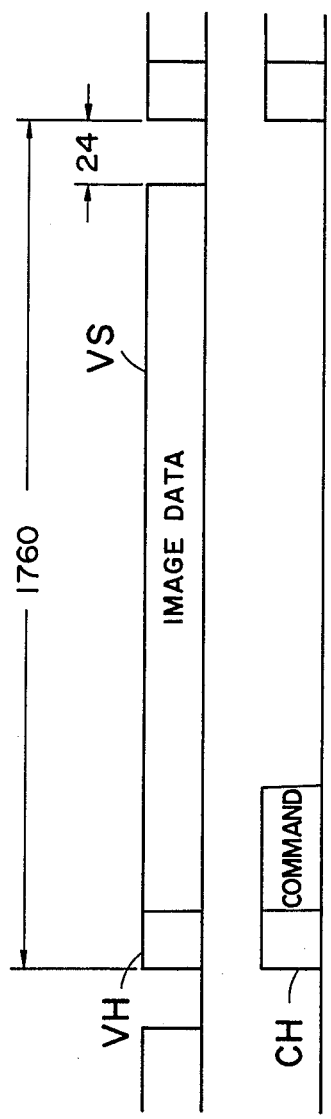
FIG. 7 is a view showing an example of the bit format of data signals.

Upon detection of the image header VH as shown in FIG. 7, the image header detector 324 supplies an image header detection signal VHS to the gate 327 to open it so as to supply the current image data DS to the first recording mechanism 301A or the second recording mechanism 301B either directly or through an image memory 301M which temporarily stores the image data. Upon detection of the command header CH, the command header detection circuit 325 generates a command header detection signal CHS. The signal CHS is supplied to a delay circuit 328 for a delay of a predetermined number of bits and is then supplied to the latch 326 as a latch signal. In this manner, when the conversion operation from the serial to parallel data is completed, the latch 326 latches the command data CD. The command data CD specifies the interruption request, start timing, the recording mechanism selection, recording color or the like; the recording mechanisms are controlled in accordance with the command data CD. The image header detection circuit 324 and the command header detection circuit 325 also supply their detection signals to a dead time generator 330 through an OR gate 329. In response to the detection signal, the dead time generator 330 generates a dead time signal DTS which is supplied to the image header detection circuit 324 and the command header detection circuit 325. While the dead time signal DTS is supplied, the image header circuit 324 and the command header circuit 325 stop operating. With this arrangement, even if the image data DS includes part of the same bit configuration as that of the image header VH or the command header CH, it is not erroneously discriminated as the image header VH or the command header CH.

The command data CD is produced from a recorder control port 352 through a reception port 350 and a bus line 351 so as to allow the recording operation in accordance with the command data CD. A signal read by an input signal level reader 353 is supplied to a central processing unit 358 (to be referred to as a CPU for brevity hereinafter) through an input signal intensity read port 354 and the bus line 351 for discrimination of the input signal level. An output signal from the CPU 358 is supplied to a transmitter 356 through a transmission port 355. After being subjected to a predetermined modulation, the signal is supplied to a light-emitting element 357 corresponding to the light-emitting element 701 of the photoreceiver 700. The control of these parts is performed by the CPU 358 with a RAM, ROM and so on.

Figure 9:
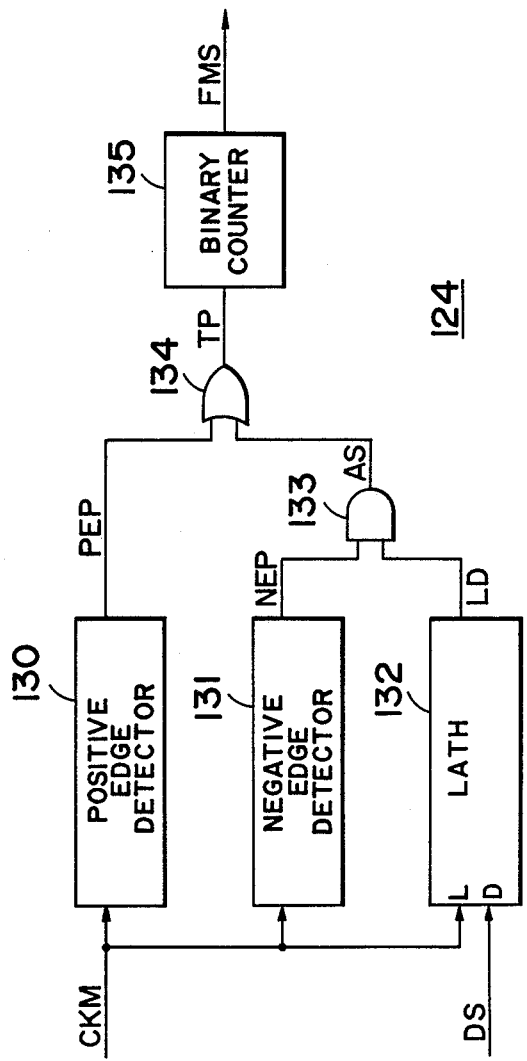
FIG. 9 is a block diagram showing an example of a frequency modulator.

FIG. 9 shows an example of the frequency modulator 124 of the reader 100, having a positive edge detector 130, a negative edge detector 131, and a latch 132. The clock signal CKM from the timing control circuit 112 is supplied to the positive edge detector 130 and the negative edge detector 131 as well as to a latch signal input terminal L of the latch 132. The data signal DS (FIG. 6) from the transmission control circuit 115 is supplied to a data input terminal D of the latch 132. In response to the positive edge of the clock signal CKM, the latch 132 latches the data signal DS. A negative edge detection pulse NEP from the negative edge detection circuit 131 and an output signal LD from the latch 132 are supplied to an AND gate 133 which produces an output AS. The output AS from the AND gate 133 together with a positive edge detection pulse PEP from the positive edge detection circuit 130 is supplied to an OR gate 134. An output TP from the OR gate 134 is supplied to a binary counter 135 as a toggle pulse. The output, the pulse-frequency-modulated signal FMS from the binary counter 135, is supplied to the LED driver amplifier 125 as described earlier.

The mode of operation of the frequency modulator 124 is as described above. If the data signal DS is at logic level "0", the output signal LD from the latch 132 is at logic level "0" and the output AS from the AND gate 133 is also at logic level "0". Therefore, the output TP from the OR gate 134 is at logic level "1" only for the period in which the positive edge detection circuit 130 detects the positive edge of the clock pulse CKM and supplies the positive edge detection pulse PEP. The signal level of the pulse-frequency-modulated signal FMS from the binary counter 135 is inverted every time the output TP from the OR gate 135 is received.

In other words, when the data signal DS is at logic level "0", the pulse-frequency-modulated signal FMS from the binary counter 135 is inverted for the time period (period $T_{CKM}$ of the clock pulse CKM) between positive edges PE of the clock pulse CKM.

Figure 10:
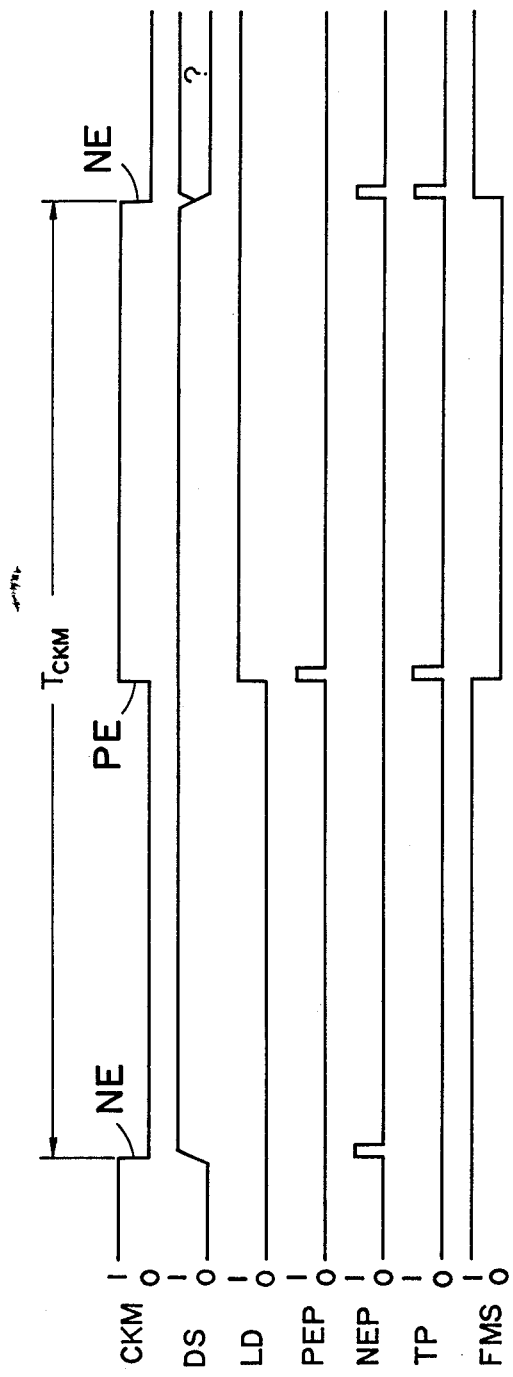
FIG. 10 shows the timing charts of the signals of the circuitry shown in FIG. 9.

Assume that the data signal DS goes to logic level "1" at some point as shown in FIG. 10. The question mark "?" in the timing chart in FIG. 10 indicates that the level of the data signal DS at this period is unknown. The latch 132 latches the data signal DS of logic level "1" in synchronism with the positive edge PE of the clock pulse CKM. In response to a negative edge NE of the clock signal CKM, the negative edge detection circuit 131 generates a negative edge detection pulse NEP. The output AS from the AND gate 133 is at logic level "1" while the negative edge detection pulse NEP is at logic level "1". The output AS of logic level "1" inverts the level of the pulse-frequency-modulated signal FMS from the binary counter 135.

When the data signal DS is at logic level "1", the pulse-frequency-modulated signal FMS from the binary counter 135 is inverted in response to both the positive edge PE and the negative edge NE of the clock pulse CKM. The time period of the inverted signal is half the period $T_{CKM}$ of the clock pulse CKM.

The recorder 300 can reproduce the data signal DS by detecting the difference in the time period between the level inversions of the pulse-frequency-modulated signal FMS.

Figure 11:
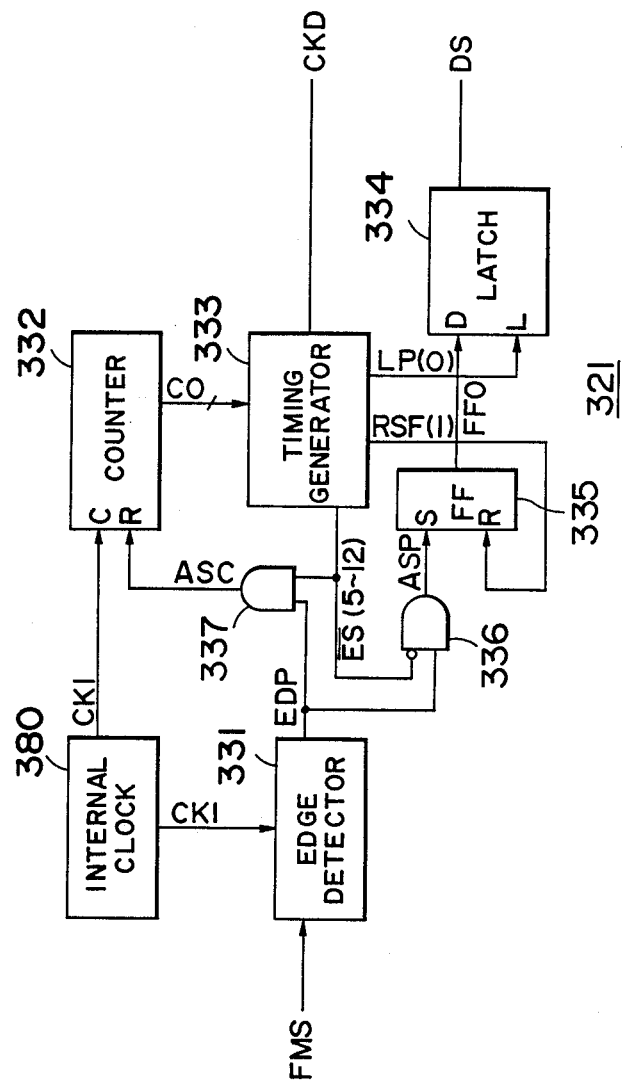
FIG. 11 is a block diagram of an example of a pulse demodulator.

FIG. 11 shows the circuit configuration of the demodulator 321 of the recorder 300. An internal clock generator 380 generates an internal clock pulse CKI. In this embodiment, a period $T_{CKI}$ of the internal clock pulse CKI is 1/16 the period $T_{CKM}$ of the clock signal CKM supplied to the frequency modulator 124 of the reader 100 described above.

The internal clock pulse CKI is supplied to an edge detector 331 and to a counter 332. In response to the positive or negative edge of the pulse-frequency-modulated signal FMS, the edge detector 331 generates an edge detection pulse EDP in synchronism with the internal clock pulse CKI. The edge detection pulse EDP is supplied to AND gates 336 and 337. The counter 332 counts the internal clock pulse CKI received, and supplies a count C0 thereof in the form of 5-bit parallel binary code to a timing generator 333. The timing generator 333 generates respective signals in accordance with the count C0. The contents of the respective signals and the parts to supply with these signals are shown in the table below.

| Signal Name | Parts Supplied With Signals | Signal Contents |
| --- | --- | --- |
| Latch pulse LP | Latch 334 (L) | "1" when count C0 is 0 |
| Reset pulse RSF | Flip-Flop 335 (R) | "1" when count C0 is 1 |
| Edge selection signal ES | AND gates 336 and 337 (supplied to 336 after inversion) | "0" when count C0 is 5 to 12 and "1" otherwise |
| Demodulated clock signal CKD | Timing generator 322 | "0" when count C0 is 0 to 7 and "1" otherwise |

An output pulse ASP from the AND gate 336 is supplied to a set terminal S of an RS flip-flop 335. An output pulse ASC from the AND gate 337 is supplied to a reset terminal R of the counter 332. An output signal FF0 from the RS flip-flop 335 is supplied to a signal input terminal D of the latch 334.

The mode of operation of the demodulator 321 will now be described with reference to the timing charts shown in FIG. 12. When the data signal DS in the reader 100 is at logic level "1", the pulse-frequency-modulated signal FMS supplied to the edge detector 331 is inverted for the period about half the period $T_{CKM}$(FIG. 10) of the clock signal CKM. During the course of transmission of the pulse-frequency-modulated signal FMS from the reader 100 to the recorder 300, the signal is distorted depending upon the characteristics of the circuit components involved. Therefore, the signal inversion period, that is, the period from a given positive edge PE to the next negative edge NE may not coincide with that from this negative edge NE to the next positive edge PE. This is why the signal inversion period described above is kept half the period $P_{CKM}$ of the clock signal CKM. The above also applies to the signal inversion period between a positive edge PE to the next negative edge NE when the data signal DS is at logic level "0".

Figure 12:
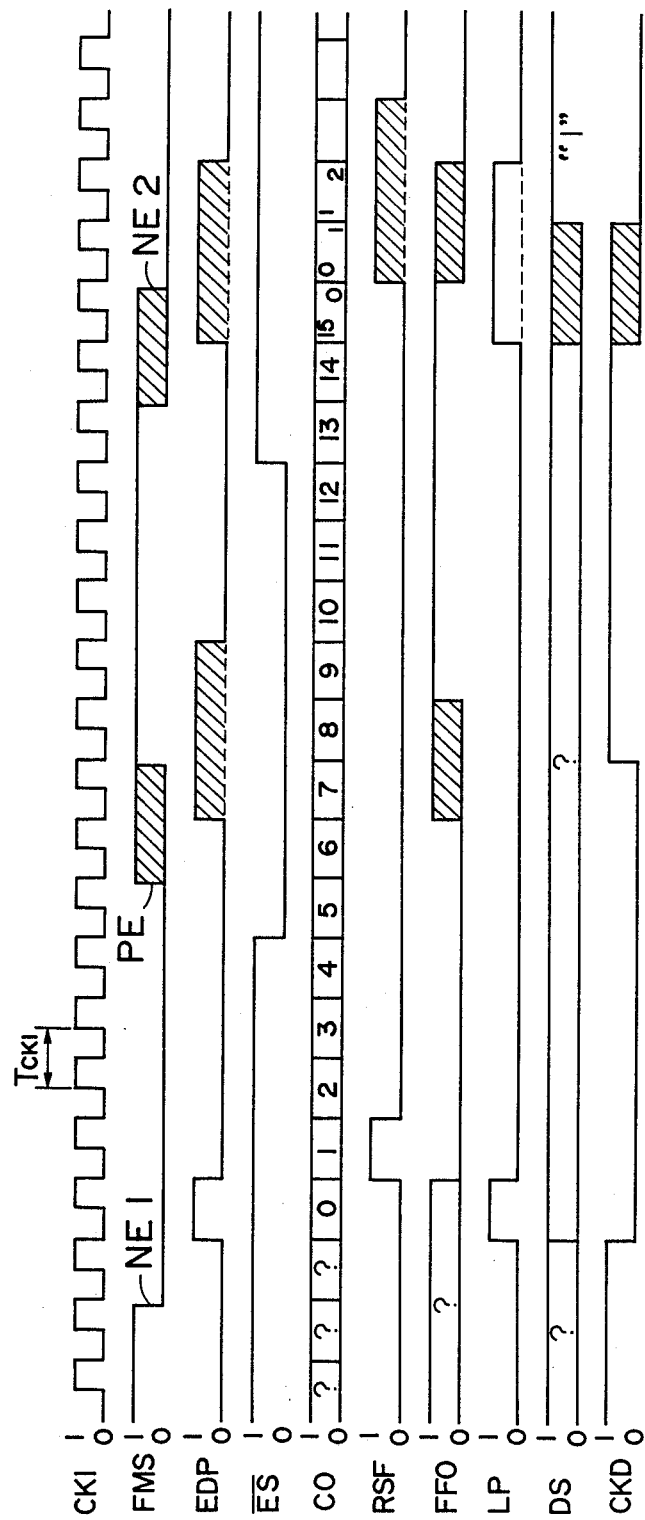
FIG. 12 shows the timing charts of the signals of the circuitry shown in FIG. 11.

Given the above situation, in the timing chart of the pulse-frequency-modulated signal FMS in FIG. 12, a positive edge PE or a negative edge NE with reference to a given negative edge NE1 is indicated within a predetermined range by hatched lines. In other timing charts in FIG. 12 also, edges corresponding to the edges of the pulse-frequency-modulated signal FMS are indicated within predetermined ranges by hatched lines.

In response to the positive or negative edge of the pulse-frequency-modulated signal FMS, the edge detector 331 generates an edge detection pulse EDP in synchronism with the negative edge of the internal clock pulse CKI. Since an edge selection signal $\overline{ES}$ is at logic level "1" at this time, the output ASC from the AND gate 337 goes to logic level "1" to reset the counter 332 so that the count C0 thereof is cleared to 0.

When the count C0 is cleared to 0, a latch pulse LP from the timing generator 333 is supplied to the latch 334 which latches the signal FF0 currently supplied to the data input terminal D thereof. The output signal FF0 from the RS flip-flop 335 which is latched at this point corresponds to the content of the data signal DS one bit before the data signal DS of logic level "1" from the negative edge NE1 to the negative edge NE2. Since the level of this portion of the data signal DS is unknown, it is designated by a question mark "?" in FIG. 12.

After the counter 332 is reset, it counts the internal clock pulses CKI and supplies a count C0 to the timing generator 333. In accordance with the count C0, the timing generator 333 generates various signals. When the count C0 becomes 1, the timing generator 333 supplies a reset pulse RSF to the reset terminal R of the RS flip-flop 335. Then, the output signal FF0 from the RS flip-flop 335 goes to logic level "0". When the count C0 is within the range of 5 to 12, the edge selection signal $\overline{ES}$ is at logic level "0". In the example shown in FIG. 12, when the data signal DS is at logic level "1", the pulse-frequency-modulated signal FMS is inverted, and the edge detector 331 detects the corresponding positive or negative edge (PE in FIG. 12) and produces an edge detection pulse EDP.

The edge selection signal $\overline{ES}$ is inverted and is supplied to the AND gate 336. Therefore, when the edge detection pulse EDP is supplied to the AND gate 336 within the period in which the signal obtained by inversion of the edge selection signal $\overline{ES}$ is at logic level "1", that is, while the count C0 is 5 to 12, the output ASP from the AND gate 336 is at logic level "1". As a consequence, the RS flip-flop 335 is set, and its output signal FF0 goes to logic level "1".

When the count C0 exceeds 12, the edge selection signal $\overline{ES}$ returns to logic level "1" again. When the pulse-frequency-modulated signal FMS is inverted thereafter, the edge detector 331 generates the edge detection pulse EDP. Since the edge selection signal $\overline{ES}$ is at logic level "1" at this time, both inputs to the AND gate 337 are at logic level "1" as in the case of the negative edge NE1 described above. Thus, the output ASC from the AND gate 337 goes to logic level "1", and the counter 332 starts counting from 0 again. When the count C0 is 0, the latch 334 latches the logic level "1" of the output signal FF0 from the RS flip-flop 335, that is, the logic level "1" of the data signal DS corresponding to the positive edge PE between the negative edges NE1 and NE2 of the pulse-frequency-modulated signal FF0 shown in FIG. 12.

When the data signal DS to be transmitted is at logic level "0", the edge selection signal $\overline{ES}$ is at logic level "0". For this reason, for the time period in which the signal of logic level "1" obtained by inverting the edge selection signal $\overline{ES}$ of logic level "0" is supplied to the AND gate 336, the pulse-frequency-modulated signal FMS is not inverted, and therefore the edge detection pulse EDP is not supplied to the AND gate 336. The output signal FF0 from the RS flip-flop 335 remains at logic level "0". The logic level "0" of the output signal FF0 is latched by the latch 334 in response to the next negative edge NE or the next positive edge PE, and the logic level "0" of the data signal DS is produced.

In the example shown in FIG. 12, when the data signal DS to be transmitted is at logic level "1", the pulse-frequency-modulated signal FMS is inverted from the negative edge to the positive edge and then back to the negative edge. However, it is noted that there is also another level inversion indicating the data signal DS of logic level "1" which occurs in the manner opposite to that described above.

An output from the demodulator 321, that is, the demodulated data signal DS and the demodulated clock signal CKD are supplied to the serial-to-parallel converter 323 and to the timing generator 322, as shown in FIG. 8, in order to perform recording on the basis of these signals. In this case, the demodulated clock signal CKD generated by the demodulator 321 is in complete synchronism with the pulse-frequency-modulated signal FMS. Accordingly, even if the time period between the edges has an error, the CPU, the recording mechanisms 301A and 301B and so on may be operated with reference to the demodulated clock pulse CKD, thereby allowing correct reproduction of the data signal DS.

Figures 2, 13A:
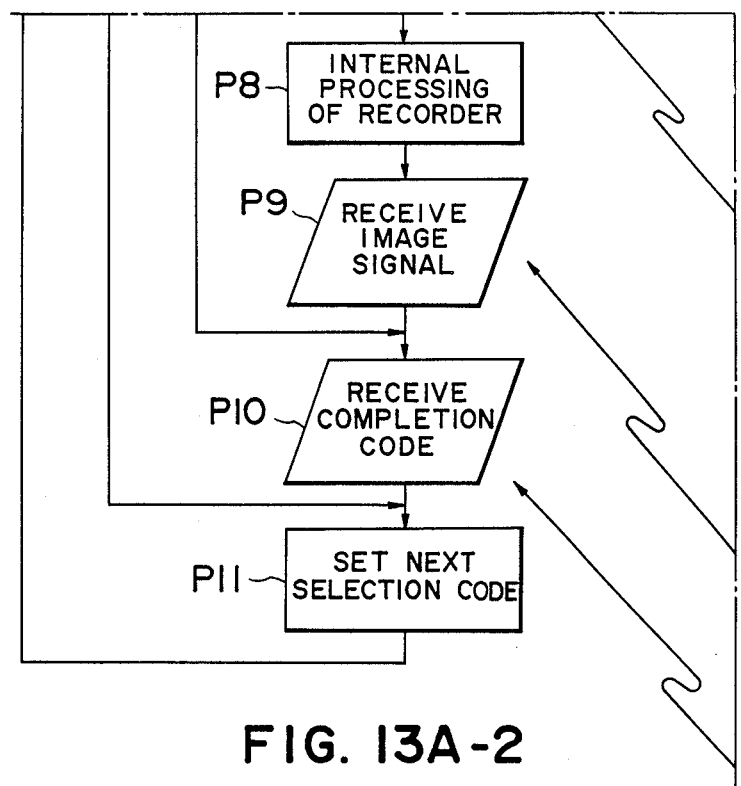
Figure 13:
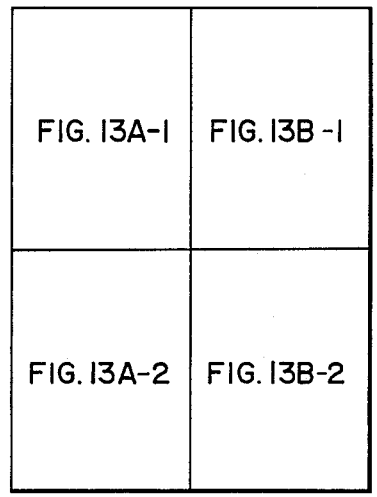
Figures 1, 13A:
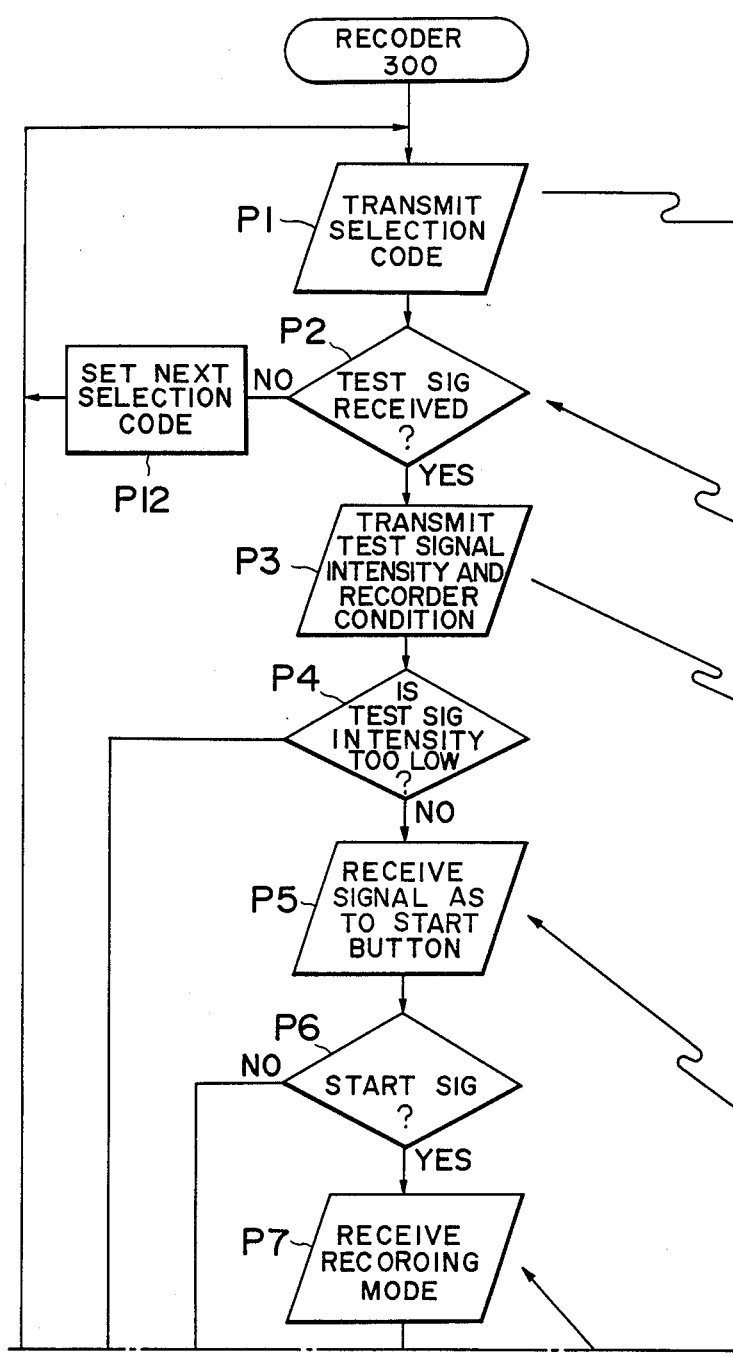
Figures 1, 13B:
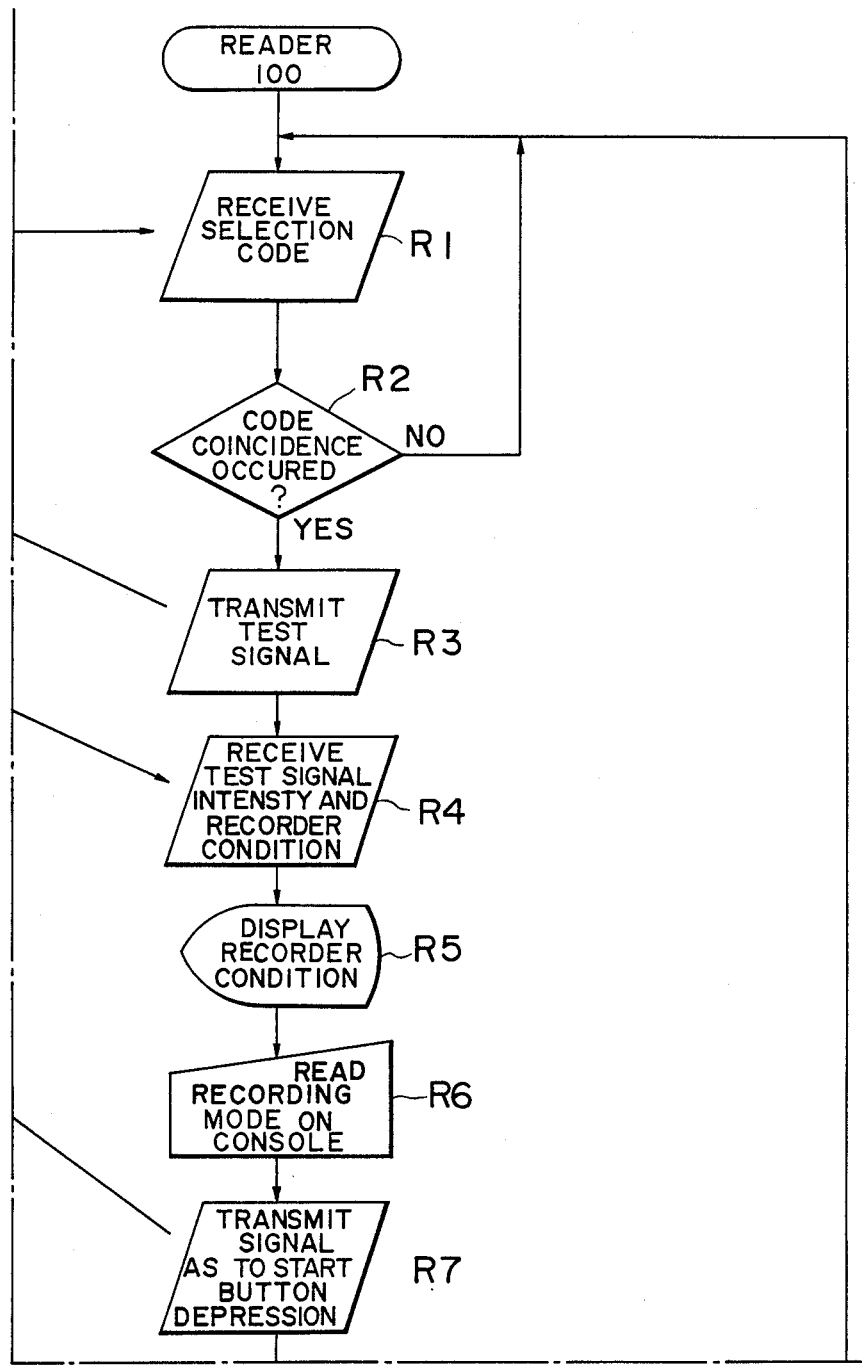
Figures 2, 13B:
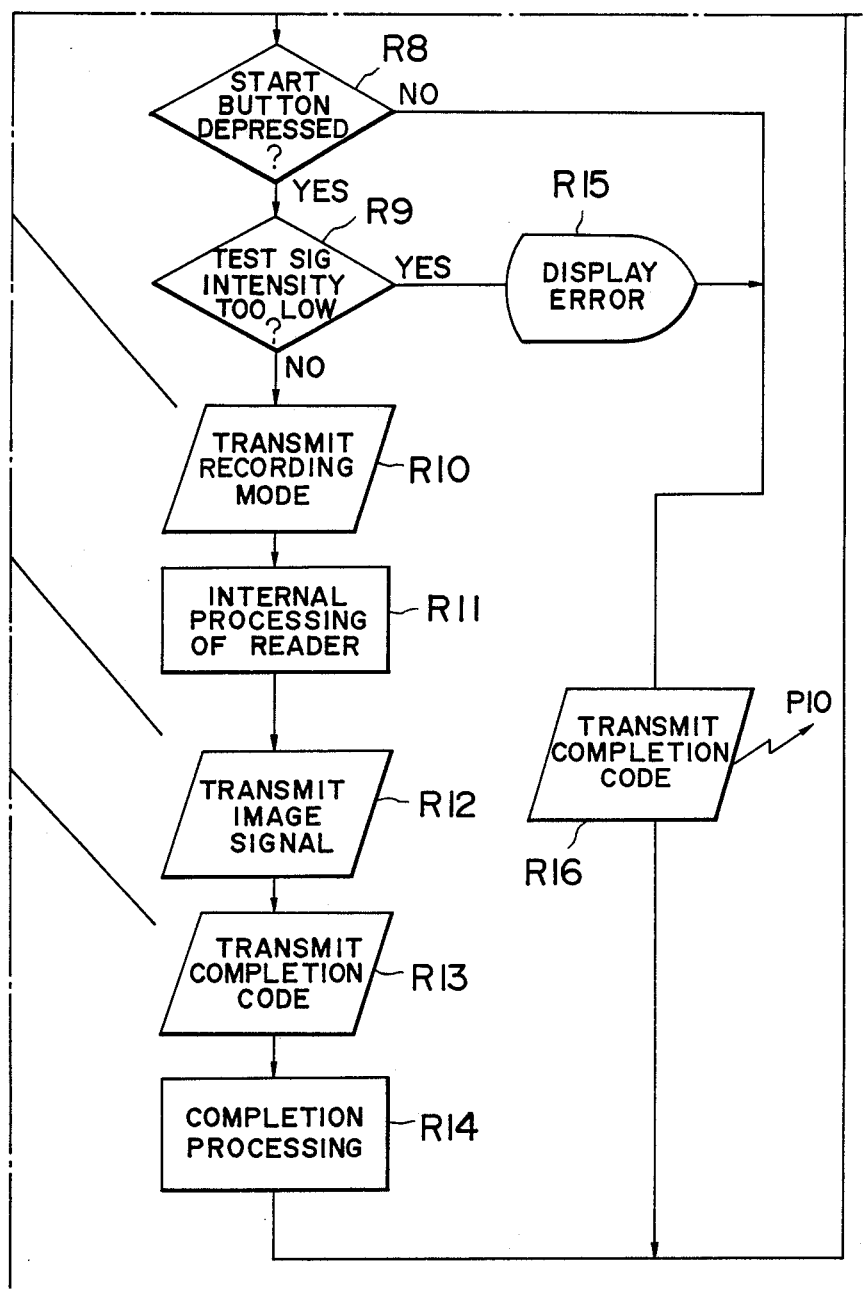

The recording procedure of the image recording apparatus of the present invention will now be described with reference to FIGS. 13A and 13B. FIG. 13A is a flowchart of the recorder 300, while FIG. 13B is a flowchart of the reader 100. Referring to FIG. 13A, in step P1, the recorder 300 sequentially transmits to a plurality of readers 100 the selection codes respectively assigned to the readers 100. These selection codes may be simultaneously supplied to the phototransmitters 500 of the plurality of readers 100 which are arranged remote from the photoreceiver 700 which radiates light of relatively weak directionality, or directivity. In step R1, a selection signal is received by a reader 100. In step R2, it is discriminated whether the reader 100 corresponding to the selection code has received the selection code. If YES in step R2, the flow advances to step R3 to transmit a test signal.

In step P2, it is discriminated if the test signal is received. If YES, the recorder 300 transmits the intensity of the light received and the condition of the recorder 300, that is, the current recording mode or the currently selected recording mechanism, to the readers 100, in step P3. In step P4, it is discriminated whether the intensity of the test signal from the reader 100 is too low. If YES in step P4, the flow advances to step P11 to set the next selection code. On the other hand, if NO in step P4, a signal as to start button from the reader 100, that is, a signal representing if the start button is depressed, is received.

At the reader 100, in step R4, the test signal intensity and the recorder condition are received. In step R5, the recorder condition or the like is displayed by a display (not shown). The recording mode set on the console of the reader 100 by the operator is read in step R6, and the signal as to the recording start button 121e is transmitted in step R7.

The recorder 300 receives the signal as to start button in step P5. It is then discriminated in step P6 whether a start signal is received which indicates that the start button 121e is depressed. If YES in step P6, the recording mode set by the reader 100 is received in step P7.

It is discriminated in step R8 of the reader 100 whether the recording start button 121e is depressed. If YES in step R8, it is discriminated in step R9 whether the test signal intensity transmitted from the recorder 300, that is, the data received in step R4, is too low. If NO in step R9, the recording mode set at the console by the operator is transmitted in step R10.

In step P7 of the recorder 300, the recording mode set at the reader 100 is received, and the internal processing of the recorder 300, that is, the control of the mechanical system, is performed in step P8. More specifically, the recording paper sheet 305 in the selected recording mechanism is fed to the position of the register roller 308 (FIG. 5) so as to allow synchronism with the reader 100. Thereafter, the image signal is received in step P9.

After the reader 100 transmits the recording mode in step R10, the internal processing, that is, the control of the mechanical system or the like is performed in step R10. For example, the light source 108 is turned on and the original 101 is fed toward the reading position A (FIG. 3) by the paper feed rollers 102. In step R12, the image signal is transmitted to the recorder 300 after reading it from the original.

After the image signal is received in the recorder 300 in step P9, a completion code representing completion of transmission of the image signal is received in step P10. Meanwhile, after reading all the image data on the original 101, the completion code is transmitted to the reader 100 in step R13. In step R14, completion processing is performed; the original is exhausted, the mechanical system is stopped, the light source 108 is turned off and so on. After receiving the completion code in step P10 in the recorder 300, the flow advances from step P10 to step P11 wherein the next selection code is set.

If NO in step P2 of the recorder 300, that is, if the test signal is not received from the reader corresponding to the selection code, the flow advances to step P12 wherein the next code is selected. If YES in step R9 of the reader 100, an error is displayed by the display (not shown) of the reader 100 in step R15. The flow then advances to step R16 to transmit the completion code.

According to the embodiment of the present invention as described above, the various data signals are exchanged between the recorder and the readers so as to perform optimal recording. The image data is transmitted from the readers to the recorder by a communication medium having a relatively strong directionality, or directivity, so as to eliminate the adverse effects of reflection or refraction and to allow reproduction of an optimal image. At the same time, the data is transmitted from the recorder to the readers by a communication medium having a relatively weak directionality, or directivity, to allow simultaneous transmission of data to a plurality of readers, facilitating free selection of installation locations or moving of the readers.

An image recording transmission apparatus with improved operability is provided according to this embodiment of the present invention.

Signal transmission from the recorder to the readers may be accomplished by various means such as electromagnetic wave communication, base band communication, space optical communication or the like.

As has been described earlier, the readers 100 may be moved independently of the recorder 300. For example, if the arrangement of an office must be changed, transmission lines need not be reinstalled to restart image signal transmission.

However, due to misalignment between the recorder and the readers caused in moving, transmitted signals may not be reliably transmitted to the readers.

Moreover, when a plurality of readers use a common recorder, it is preferable that, if the recorder is in operation in response to the image signals from one reader, the other readers be capable of discriminating this condition.

In view of this, an image transmission apparatus according to another embodiment of the present invention will now be described, which has functions of signalling the mismatch of signals due to misalignment of the locations and of signalling the condition of the recorder.

Figure 14:
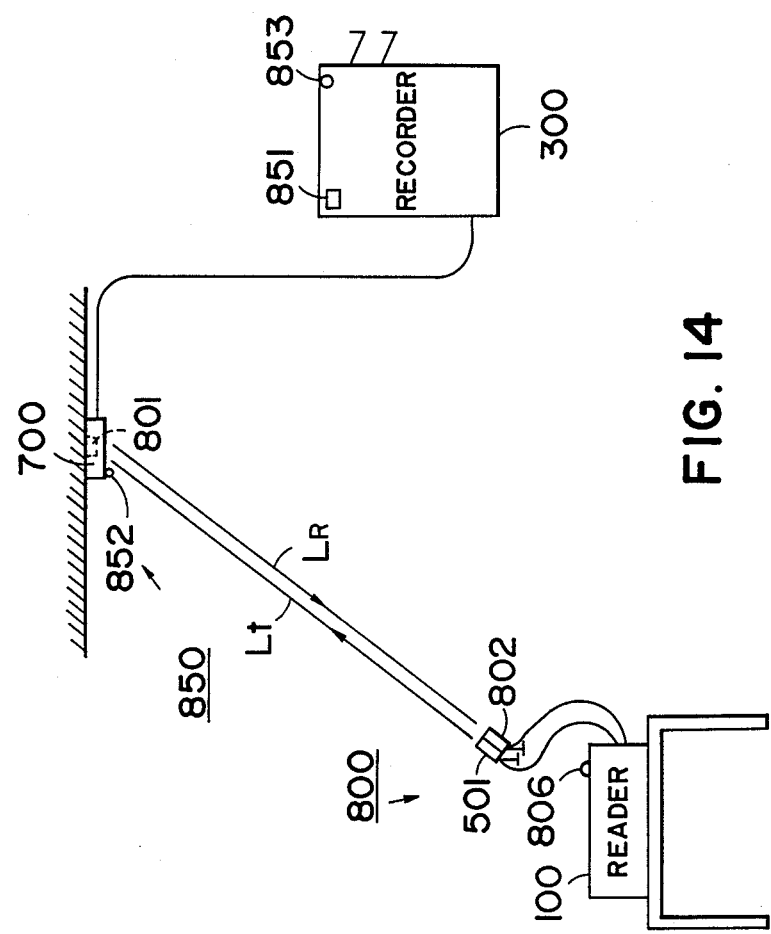
FIGS. 14 and 15 are views showing other embodiments of the image transmission apparatus with read/record status indicators according to the present invention.

FIG. 14 shows the embodiment which adds a reading system emergency alarm means 800 and a recording system ready signalling means 850. The reading system emergency alarm means 800 detects an emergency of the light beam transmission system and signals such an emergency to the operator. A reflector 801 correctly returns the light beam Lt emitted by the light-emitting element 501 theretoward. The reflector 801 may comprise a corner cube or a reflex reflector. A light-receiving element 802 receives a reflected light beam $L_R$ reflected by the reflector 801 and converts it into an electric signal.

Figure 15:
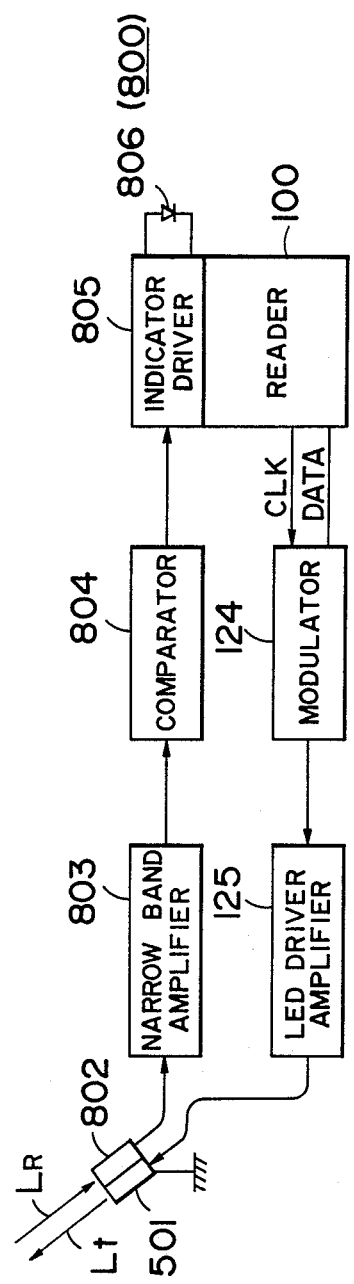

FIG. 15 shows the configuration of the reading system emergency alarm means 800 shown in FIG. 14. A narrow band amplifier 803 amplifies the amplitude of the detection signal which is obtained by photoelectric conversion by the light-receiving element 802. A comparator 804 compares an output signal from the narrow band amplifier 803 with a signal of a predetermined level. In response to an alarm signal which is supplied from the comparator 804, an indicator driver 805 drives an indicator 806. The indicator 806 may comprise a lamp such as an LED or a buzzer which indicates to the operator that the recorder and the reader are not well aligned. The indicator driver 805 and the indicator 806 are arranged on the reader 100.

The mode of operation of the reading system emergency alarm means 800 will now be described with reference to FIGS. 14 and 15. In a predetermined period during the image read ready period or image read period of the reader 100, the reader 100 produces a detection signal which is pulse-frequency-modulated by the modulator 124, is amplified in its amplitude by the LED driver amplifier 125, and is supplied to the light-emitting element 501. The light beam Lt emitted by the light-emitting element 501 in response to the amplified signal is radiated toward the photoreceiver 700 on the ceiling. The light beam Lt is reflected by the reflector 801 which is located at substantially the center of the photoreceiver 700. The reflected light beam $L_R$ from the reflector 801 is returned parallel to the light beam Lt and becomes incident on the light-receiving element 802 arranged next to the light-emitting element 501.

The electric signal from the light-receiving element 802 is amplified by the narrow band amplifier 803 and is supplied to the comparator 804. The signal is compared with a signal of a predetermined level by the comparator 804. If the signal is below the allowable predetermined level, the comparator 804 supplies an alarm signal to the indicator driver 805. In response to the alarm signal, the indicator driver 805 drives the indicator 806 to turn on or off a lamp or to generate a buzzer sound.

If the light-emitting element 501 is not correctly aligned with the photoreceiver 700, or if an obstacle is present therebetween, the light beam Lt emitted by the light-emitting element 501 is not reflected by the reflector 801 and the light-receiving element 802 does not receive the reflected light beam $L_R$. If the distance between the light-emitting element 501 and the phototransmitter 700 exceeds a predetermined distance which allows clear imaged signal reading, even if the reflected light beam $L_R$ becomes incident on the light-receiving element 802, the intensity of the reflected light beam $L_R$ becomes lower than that obtainable when the light-emitting element 501 is at a proper location.

Since, however, the output signal from the light-receiving element 802 is supplied to the comparator 804 through the amplifier 803 to be compared with a signal of a predetermined allowable level, an abnormal orientation of the light-emitting element 501 as described above can be detected. Then, the indicator 806 can indicate to the operator that the position or the orientation of the light-emitting element 501 is not proper for image reading operation. In this manner, even if the positional relationship between the light-emitting element 501 and the photoreceiver 700 is abnormal, the indicator 806 is driven to immediately signal the fact to the operator. Then, the operator can change the position or orientation of the light-emitting element 501 so that the condition of the light-emitting element 501 may be kept optimal and correct light beam transmission may be performed. The output signal from the comparator 804 may also be supplied to the reader 100 to interrupt the reading operation thereof if a problem occurs.

The recording system ready signalling means 850 shown in FIG. 14 will now be described in more detail. A recording system ready detector 851 detects the recording ready status of the recorder 300 and transmits a communication signal. An indicator 852 receives the communication signal from the detector 851 with or without a cable and indicates to the operator if the recording system is ready. The indicator 852 may comprise a lamp such as an LED or a buzzer and is mounted on the photoreceiver 700 on the ceiling or on the reader 100.

If the recorder 300 is not ready for a reader 100 which requests to start image signal transmission, for example, if the recorder 300 is receiving image signals from another reader 100, the recording system ready detector 851 detects this fact and transmits a communication signal to the indicator 852 mounted on the associated photoreceiver 700 or on the reader 100 itself. The indicator 852 thus performs predetermined display operation. Upon reception of the communication signal representing that the reader 100 is not ready, the lamp of the display is turned on or off or the buzzer sound is generated to signal to the operator that the recorder is not ready for image signal transmission. Alternatively, an indicator 853 mounted on the detector 851 may be turned on or off in the case of a lamp or may be used to generate a buzzer sound in the case of a buzzer. In this manner, the indicator 852 or 853 is capable of signalling to the operator if the recorder 300 is ready for a reader 100 which requests to perform image signal transmission. Accordingly, image signal transmission is facilitated without any loss.

Figure 16:
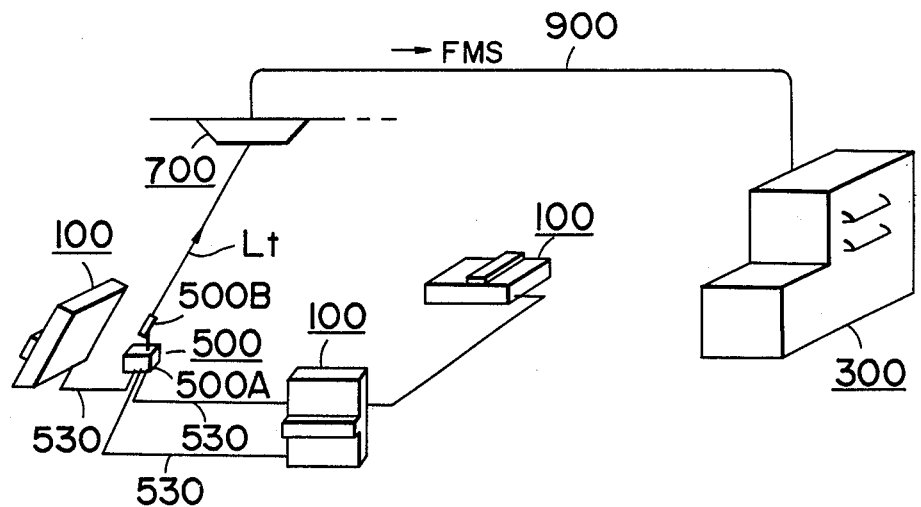
FIG. 16 is a view showing still another embodiment of the image transmission apparatus according to the present invention.

The reading system alarm means 800 is not limited to those which use the reflector 801 or the light-receiving element 802 as shown in FIGS. 14 and 15. As shown in FIG. 1 or 16, the intensity of the image signal supplied to the recorder 300 through the coaxial cable 900 may be compared by the input signal intensity reader 353 including the comparator or the like. The indicator may then be turned on or off in the case of a lamp or may be used to generate a buzzer sound in the case of a buzzer, thus signalling to the operator that the recorder is not ready.

In summary, according to this embodiment of the present invention, the alignment of the phototransmitter and the photoreceiver and the ready state of the recorder and so on may be signalled to the operator to facilitate reliable image signal transmission.

In the image transmission apparatuses of the embodiments described above, each reader 100 has a phototransmitter. Another embodiment of the present invention will now be described with reference to FIGS. 16 and 17 wherein a plurality of readers use a common phototransmitter, so that the overall apparatus may be compact in size and inexpensive to manufacture.

Figure 17:
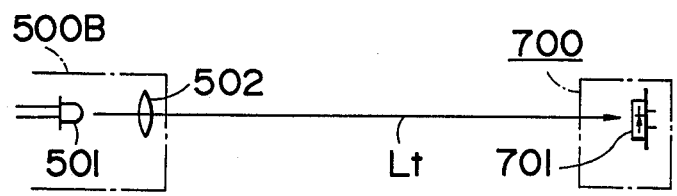
FIG. 17 is a view showing still another embodiment of the image transmission apparatus for space optical transmission.

In FIGS. 16 and 17, the same reference numerals as in FIG. 1 denote the same parts. Each decentralized reader 100 has a one-dimensional solid-state image pickup element such as a CCD line image sensor which reads the image on an original and generates time-serial image data VDA. The image data VDA is quantized to provide quantized image data VD which is supplied together with command data CD for controlling the operation of the recorder 300 to the frequency modulator in the reader. The frequency modulator pulse-frequency-modulates predetermined clock signals with these signals (to be referred to as data signals DS). A phototransmitter 500 has a selector 500A and a phototransmitter unit 500B.

The phototransmitter 500 and each reader 100 are connected through a cable 530 through which the data signal DS is supplied to the phototransmitter 500. When a contention occurs between at least two readers 100, all but one are prohibited from transmitting; specifically, in this embodiment, the selector 500A selects one of these readers 100 which may use the recorder 300 first. The selected reader starts reading the image on the original, pulse-frequency-modulates the readout image data VD, and supplies the pulse-frequency-modulated signal FMS to the phototransmitter unit 500B. In the phototransmitter unit 500B, as shown in FIG. 17, a light-transmitting element 501 such as a light-emitting diode or a laser diode is driven.

Light emitted by the light-emitting element 501 is focused by a lens 502 into the light beam Lt which is directed toward the photoreceiver 700 mounted on the ceiling or the like.

A light-emitting element 701 incorporated in the photoreceiver 700 such as an avalanche photodiode converts the intensity of the light beam Lt into an electric signal to reproduce the pulse-frequency-modulated signal FMS. The pulse-frequency-modulated signal FMS thus obtained is supplied to the recorder 300 through a coaxial cable 900. The recorder 300 extracts, from the supplied frequency-modulated signal FMS, the image data VD, the write control clock signal WCK, and the command data CD. On the basis of these signals, the recorder 300 performs a predetermined image recording operation.

Figure 18A:
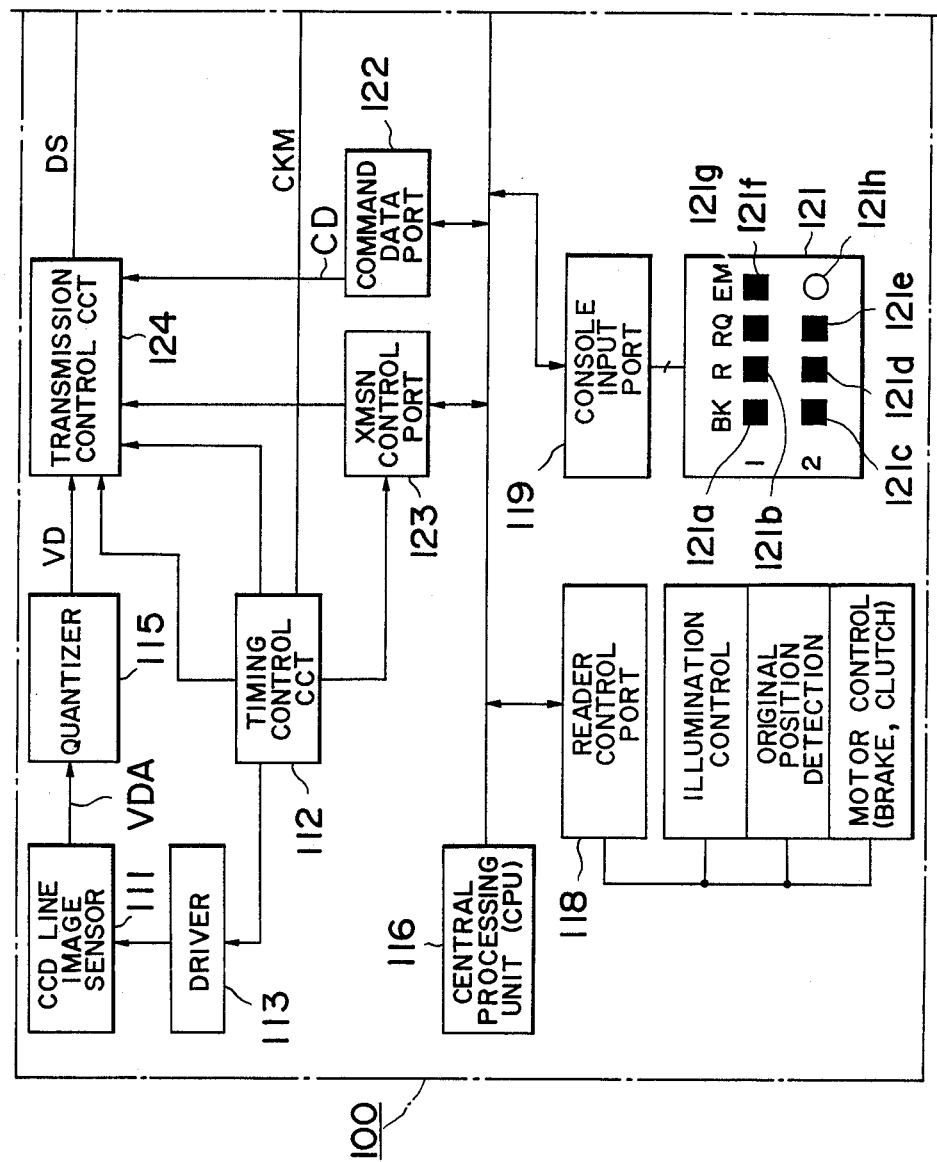

FIG. 18 shows the configuration of the control circuit for the reader 100 and for the phototransmitter 500 connected to the reader 100. The same reference numerals as those in FIG. 6 denote the same parts in FIG. 18. A CCD line image sensor 111 is driven by a driver 113 which is, in turn, controlled by the timing signal from a timing control circuit 112. The CCD line image sensor 111 generates the time-serial image data VDA. A quantizer 114 quantizes the image data VDA into the quantized image data VD which is supplied to a transmission control circuit 115. A central processing unit 116 (to be referred to as a CPU hereinafter for brevity) controls the operation of the reader 100 in accordance with a control program written in a memory 117 such as a RAM or ROM. A reader control port 118 supplies a flash signal to a light source 108 such as a halogen lamp, and drive signals for the clutch and brake to rotate or stop paper feed rollers 102 and 103. A reader control port 118 also receives detection signals from original position detectors 106 and 107. A console input port 119 receives a recorder control signal from a control console 121 mounted on a cover 120 on the top surface of the reader 100. The control console 121 has four push buttons 121a to 121d for selecting the recording mechanism and the recording color, a request button 121g for supplying to the selector 500A of the phototransmitter 500 a service request signal, a recording start button 121e, a cancel button 121f, and an indicator 122h for indicating if the service request is allowed. When the push button 121a is depressed, the image data VD is supplied to an ink jet head 302 for black recording of a first recording mechanism 301A to perform recording in black. The following table shows the relationship between the respective push buttons and the recording colors.

| Push button No. | Recording mechanism No. | Recording color |
|---|---|---|
| 121a | 301A | Black |
| 121b | 301A | Red |
| 121c | 301B | Black |
| 121d | 301B | Red |

A command data port 122 supplies to the transmission control circuit 115 the various command data CD for controlling the recording operations of the first and second recording mechanisms 301A and 301B. A XMSN control port 123 supplies a transmission control signal for controlling the operation of the transmission control circuit 115. In accordance with the timing signal and the transmission control signal, the transmission control circuit 115 subjects to predetermined processing the image data VD supplied from the quantizer 114 or the command data CD supplied from the command data port 112. The data signal DS from the transmission control circuit 115 is supplied to a frequency modulator 124. The frequency modulator 124 pulse-frequency-modulates the clock sgnal CKM from the timing control circuit 112 by the data signal DS.

An I/O port 125 exchanges signals with the phototransmitter 500. When the request button 121g of the control console 121 is depressed, a service request signal TREQ is supplied to the selector 500A from the I/O port 125. The selector 500A discriminates whether the service request is to be accepted, and supplies a service request accept signal TACK to the I/O port 125 if the service request is to be accepted. In response to the signal TACK from the phototransmitter 500, the reader 100 turns on the indicator 121h of the control console 121. Upon depression of the start button 121e, the reader 100 starts reading the original and pulse-frequency-modulates at the frequency modulator the image data VD read from the original.

The pulse-frequency-modulated signal FMS from the frequency modulator 124 is supplied to an LED driver amplifier 503 which drives the light-emitting element 501 of the phototransmitter 500. Light emitted by the light-emitting element 501 is focused by a lens 502 into the light beam Lt which is supplied to the photoreceiver 700.

The signal received by the photoreceiver 700 is demodulated by the demodulator of the recorder 300 shown in FIG. 8 into the demodulated clock signal CKD and the demodulated data signal DS.

Figure 19:
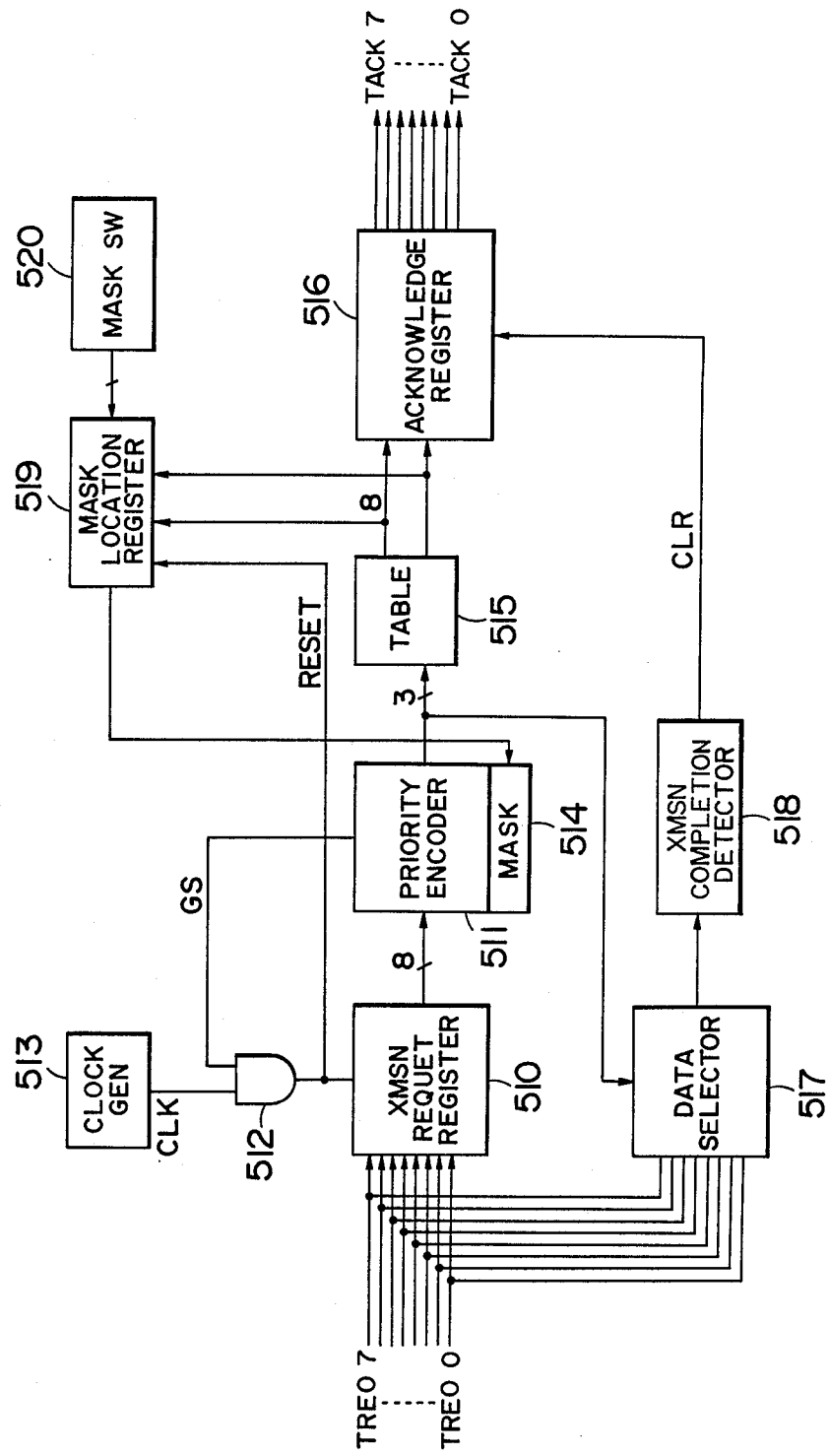
FIG. 19 is a block diagram of an example of the selection circuit shown in FIG. 18.

FIG. 19 shows an example of the selector of the phototransmitter 500. A XMSN request register 510 has a number of bits which corresponds to the number of the readers 100. The service request signal TREQ is supplied from each reader 100 to the XMSN request register 510. A control signal GS from a priority encoder 511 and a clock signal CLK from a clock generator 513 are supplied to the input end of an AND gate 512. The control signal GS is normally at logic level "1". In response to the clock signal CLK from the clock generator 513, the AND gate 512 is opened. An output signal of logic level "1" from the AND gate 512 is supplied as a latch signal to the XMSN request register 510 and is also supplied as a reset signal REST to a mask location register to be described later. In response to the latch signal, the XMSN request register 510 fetches the service request signal TREQ from each reader 100.

The contents of the XMSN request register 510 are supplied to the priority encoder 511 which determines the priority of the readers 100 which have requested services of the recorder 300 and encodes the determined priority order into binary codes. The priority encoder 511 has a mask register 514 which has a number of bits corresponding to the number of the readers 100. The priority order of the readers 100 which have requested services is determined for the readers 100 which are not masked by this mask register 514. After the service request signal TREQ latched in the register 510 is given the priority order by the priority encoder 511, the control signal GS is inverted to logic level "0". Then, the AND gate 512 is closed and the latch signal ceases to be generated. The XMSN request register 510 no longer accepts a service request signal TREQ.

A table 515 as a decoder decodes the encoded output from the priority encoder 511. In accordance with a timing signal TIM supplied from the table 515, an acknowledge register 516 supplies a service request accept signal TACK to the corresponding reader 100. The reader 100 which has received the service request accept signal TACK can assume transmission. When the reading operation of the original is started, the readout image data is transmitted to the recorder 300 for recording.

A data selector 517 receives the encoded output from the priority encoder 511 and the service request signal TREQ from the reader 100 corresponding to the encoded output. The data selector 517 supplies the signal TREQ to a XMSN completion detector 518. In this manner, the signal TREQ from the reader 100 whose request signal has been accepted is supplied to the XMSN completion detector 518. When the XMSN completion detector 518 detects the completion of the supply of the signal TREQ, it judges that transmission of the image data from the reader 100 is completed and supplies a clear signal CLR to the acknowledge register 516 to reset it. Then, the output of the service request accept signal TACK from the register 516 to the reader 100 is interrupted.

A mask location register 519 selects the reader 100 to be masked. The contents of the mask location register 519 are fetched into the mask register 514. The priority encoder 511 determines the priority order among the readers 100 which are not masked by the mask register 514. Output DATA from the table 515 is supplied to the mask location register 519 and selects a reader 100 corresponding to the output DATA. Then, the mask register 514 masks the reader 100 whose request signal is accepted. Therefore, the priority encoder 511 provides the priority order to the readers 100 which have produced the service request signals but whose request signals have not been accepted. Thus, the priority encoder 511 reliably determines the reader 100 which may next make an access to the recorder 300.

The request signals from the readers 100 which are latched by the XMSN request register 510 and which are given the priority order by the priority encoder 511 are accepted according to the priority order, and the image data from the reader 100 whose request has thus been accepted is recorded by the recorder 300. After processing of image data from the reader 100 which first used the recorder 300 is completed, the output GS from the priority encoder 511 to the AND gate 512 is inverted to logic level "1". In response to the clock pulse CLK from the clock generator 513, the AND gate 512 is opened and the latch signal is produced from the output end thereof. The service request signals from the readers 100 are latched and the operation as described above is performed. A mask switch 520 is a switch to allow masking of the readers 100 which have been given priority.

It is also possible to indicate to the reader 100 whose request signal is not accepted that the service request signal from another reader 100 of higher priority order is being accepted.

Figure 20:
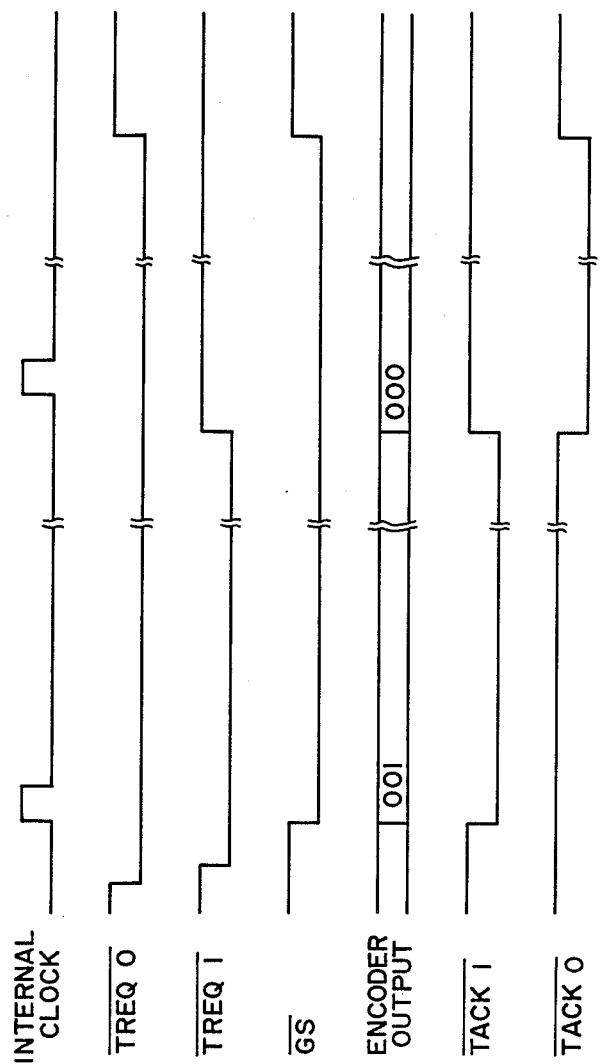
FIG. 20 shows the timing charts of the signals of the circuitry shown in FIG. 19 for explaining internal processing.

FIG. 20 shows an example of internal processing timing with the selector 500A of this configuration wherein a service request signal TREQ1 from a reader 100-1 and a service request signal TREQ2 from a reader 100-2 are simultaneously received. In this embodiment, the priority encoder 511 produces outputs "001" and "000" in correspondence with the readers 100-1 and 100-2, respectively, so as to provide a higher priority to the reader 100-1.

In this embodiment, the service request signals TREQ from a plurality of readers 100 are supplied to the selector 500A. If a contention occurs, the selector 500A determines the priority order and transmission of image data from each reader is performed according to the priority order thus determined. Therefore, if the highest priority is preset to the reader which is to be used in case of an emergency, efficient communication may be guaranteed. Furthermore, since the next request signal is not accepted until the service request read in the XMSN request register 510 is completed in accordance with the clock signal CLK from the clock generator 513, a conventional problem may be solved wherein the readers of lower priority order almost never get accepted.

In summary, even if a contention occurs among a plurality of readers which use a common recorder, smooth transmission processing may be performed.

What we claim is:

1. An image transmission system comprising:
   a plurality of image data output means each for transmitting light signals representing image data on a wireless basis and for receiving light signals representing control data related to transmission of the image data;
   image data input means for receiving the light signals representing image data from one of said plurality of image data output means and for transmitting the light signals representing control data to all of said image data output means on a wireless basis; and
   image processing means, connected to said image data input means, for processing image data represented by the light signals received by said image data input means,
   wherein the light signals representing control data are transmitted from said image data input means with lesser directivity than that with which the light signals representing image data are transmitted from said image data output means, and wherein said image data input means transmits the light signals representing control data for selecting any one of said image data output means to all of said plurality of image data output means, and the selected image data output means transmits the light signals representing image data to said image data input means.

2. A system according to claim 1, wherein the light signals representing image data and the light signals representing control data are transmitted by respective associated light signals having mutually different wave lengths.

3. A system according to claim 1, wherein said image data output means has reading means for reading an original image to generate the light signals representing image data representing the original image.

4. A system according to claim 1, wherein said image processing means performs image formation based on the light signals representing image data.

5. A system according to claim 1, wherein said image data input means has a common receiving unit through which it receives the light signals representing image data transmitted from said plurality of image data output means.

6. An image transmission system, comprising:
   a plurality of means, controlled independently of each other, for individually providing image data;
   a transmitting unit for transmitting light signals representing the image data provided by said plurality of image data providing means through a common transmitting unit; and image processing means for receiving the light signals transmitted from said transmitting means and for processing the image data represented by the received light signals, wherein said transmitting unit is controlled to permit transmission of the light signals representing the image data from one of said image data providing means according to a predetermined priority procedure, in the event that at least two of said plurality of image data providing means simultaneously provide the image data to said transmitting means.

7. A system according to claim 6, wherein said transmitting unit is controlled not to transmit light signals representing image data from said image data output means from which light signals representing image data have most recently been provided and transmitted.

8. A system according to claim 6, further comprising means for selecting a specified one or ones of said plurality of image data output means, wherein said transmitting unit is controlled to prohibit transmission of the image data from the image data output means selected by said selected means.

9. A system according to claim 6, wherein said image data output means has means for reading an original image to produce the image data.

10. A system according to claim 6, wherein said image processing means performs image formation based on the image data.

11. A system according to claim 6, wherein said transmitting unit transmits the image data in the form of a light signal on a wireless basis.

12. An image transmission system comprising:

image signal output means for converting image data into an image-representing light signal to be transmitted on a wireless basis, said image signal output means including first converting means for converting a light signal incident thereon into an electrical signal;

light-receiving means for receiving light signals from said image signal output means, said light-receiving means including second converting means for converting received light signals into electrical signals and reflecting means for reflecting received light signals back to said image signal output means;

image processing means, connected to said light-receiving means, for processing the electrical signals from said second converting means; and detecting means, connected to said first converting means, for detecting a condition of a light signal reflected back to said image signal output means, wherein said image signal output means is operable to transmit a test light signal prior to transmission of the image-representing light signal and said detecting means is operable to detect the condition based on an electrical signal from said first converting means generated in response to the test light signal reflected back to said image signal output means, wherein said image signal output means and said detecting means cooperate to prevent transmission of an image-representing light signal if said detecting means detects that the test light signal is in an improper condition.

13. A system according to claim 12, wherein said detecting means detects the intensity of the test light signal.

14. A system according to claim 12, further comprising means for displaying the condition detected by said detecting means.

15. A system according to claim 12, wherein said image signal output means has reading means for reading an original image to generate the image data representing the original image.

16. A system according to claim 12, wherein said image processing means performs image formation based on the electrical signal.

* * * * *

UNITED STATES PATENT AND TRADEMARK OFFICE
CERTIFICATE OF CORRECTION

PATENT NO. : 4,796,301
DATED : January 3, 1989
INVENTOR(S) : SHUNICHI UZAWA, ET AL.

It is certified that error appears in the above-identified patent and that said Letters Patent is hereby corrected as shown below:

Title page:

IN [57] ABSTRACT

Line 8, "proceded" should read --preceded--.

FIG. 13A-1

Block P7, "RECOROING" should read --RECORDING--.

FIG. 13B-1

Block R2, "OCCURED" should read --OCCURRED--.
Block R4, "INTENSTY" should read --INTENSITY--.

FIG. 19

Block 510, "REQUET" should read --REQUEST--.

Signed and Sealed this

Eleventh Day of July, 1989

Attest:

DONALD J. QUIGG

Attesting Officer     Commissioner of Patents and Trademarks